US010085167B2

(12) United States Patent
Li et al.

(10) Patent No.: US 10,085,167 B2
(45) Date of Patent: Sep. 25, 2018

(54) DATA TRANSMISSION METHOD AND BASE STATION

(71) Applicant: HUAWEI TECHNOLOGIES CO., LTD., Shenzhen (CN)

(72) Inventors: Jian Li, Shanghai (CN); Lei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 15/362,832

(22) Filed: Nov. 29, 2016

(65) Prior Publication Data

US 2017/0127308 A1 May 4, 2017

Related U.S. Application Data

(63) Continuation of application No. PCT/CN2014/079013, filed on May 30, 2014.

(51) Int. Cl.
*H04W 24/10* (2009.01)
*H04L 1/00* (2006.01)
(Continued)

(52) U.S. Cl.
CPC .......... *H04W 24/10* (2013.01); *H04L 1/0026* (2013.01); *H04W 72/082* (2013.01); *H04W 88/02* (2013.01)

(58) Field of Classification Search
CPC .. H04L 1/0026; H04W 24/10; H04W 72/082; H04W 88/02; H04W 72/04; H04W 72/12;
(Continued)

(56) References Cited

U.S. PATENT DOCUMENTS 9,681,390 B2 * 6/2017 Takeda ................... H04W 52/04
2008/0165776 A1 7/2008 Tao et al.
(Continued)

FOREIGN PATENT DOCUMENTS

CN 102013952 A 4/2011
CN 102405681 A 4/2012
(Continued)

OTHER PUBLICATIONS

English translation of International Search Report dated Mar. 4, 2015, in International Application No. PCT/CN2014/079013.
(Continued)

*Primary Examiner* — Robert J Lopata
(74) *Attorney, Agent, or Firm* — Kilpatrick Townsend & Stocton LLP

(57) ABSTRACT

The present invention relates to a data transmission method and a base station, the method includes: determining, by a base station according to channel state information CSI, a transmission path for forwarding first data to a first terminal, where if the base station determines that the first data needs to be forwarded by at least one small cell to the first terminal, the transmission path includes a path from the base station to a small cell and a path from the small cell to the first terminal; and sending, by the base station according to the transmission path, a first data frame to the first terminal via the at least one small cell. In the present invention, a macro base station performs centralized scheduling, and performs unified encapsulation according to a scheduled transmission path, thereby effectively simplifying processing by a forwarding node and reducing a delay.

20 Claims, 10 Drawing Sheets

(51) Int. Cl.
*H04W 72/08* (2009.01)
*H04W 88/02* (2009.01)

(58) Field of Classification Search
CPC ... H04W 76/00; H04B 7/2121; H04B 7/2123; H04J 2203/0069; H04Q 2213/394
USPC .......................................................... 370/329
See application file for complete search history.

(56) References Cited

U.S. PATENT DOCUMENTS

| | | |
|---|---|---|
| 2008/0227461 A1 | 9/2008 | Dayal et al. |
| 2010/0265842 A1 | 10/2010 | Khandekar et al. |
| 2012/0015662 A1 | 1/2012 | Zhang et al. |
| 2012/0046033 A1* | 2/2012 | Ko .......................... H04B 7/024 455/435.1 |
| 2013/0244683 A1* | 9/2013 | Fukumasa ............. H04W 40/12 455/452.2 |
| 2013/0294338 A1* | 11/2013 | Zhang .................... H04W 24/02 370/328 |
| 2015/0111592 A1* | 4/2015 | Chang ................... H04W 16/10 455/452.1 |
| 2015/0215852 A1* | 7/2015 | Gou ....................... H04W 48/16 455/434 |
| 2015/0244429 A1* | 8/2015 | Zhang .................... H04B 7/024 370/329 |
| 2015/0282131 A1* | 10/2015 | Nagata .................. H04W 16/32 370/329 |
| 2015/0312757 A1* | 10/2015 | Wang ..................... H04W 12/04 370/254 |
| 2015/0341786 A1* | 11/2015 | Wang ..................... H04W 12/04 455/411 |
| 2015/0373712 A1* | 12/2015 | Lee ...................... H04W 72/0453 370/329 |
| 2016/0050706 A1* | 2/2016 | Zhang ..................... H04W 4/70 370/280 |
| 2016/0205604 A1* | 7/2016 | Kang ................. H04W 36/0072 370/331 |
| 2016/0345194 A1* | 11/2016 | Agyapong ............ H04W 24/10 |
| 2016/0345250 A1* | 11/2016 | Agyapong ............ H04W 48/16 |
| 2017/0006627 A1* | 1/2017 | Huang .................. H04W 16/32 |
| 2017/0188286 A1* | 6/2017 | Yonekura .............. H04W 16/28 |
| 2018/0049186 A1* | 2/2018 | Hong ................. H04W 72/0413 |
| 2018/0103380 A1* | 4/2018 | Ode ...................... H04W 76/10 |

FOREIGN PATENT DOCUMENTS

| | | |
|---|---|---|
| CN | 103731897 A | 4/2014 |
| EP | 1919135 A2 | 5/2008 |

OTHER PUBLICATIONS

European Search Report dated Jun. 6, 2017 in the corresponding European Application No. 14893421.9.
3GPF TR 36.842 V0.4.2(Nov. 2013), 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), in Nov. 2013, 68 pages.

* cited by examiner

DATA TRANSMISSION METHOD AND BASE STATION

CROSS-REFERENCE TO RELATED APPLICATIONS

This application is a continuation of International Application No. PCT/CN2014/079013, filed on May 30, 2014, the disclosure of which is hereby incorporated by reference in its entirety.

TECHNICAL FIELD

The present invention relates to the field of communications technologies, and in particular, to a data transmission method and a base station.

BACKGROUND

As mobile Internet services increase rapidly, in several foreseeable years in the future, existing mobile communication spectrum resources will not be able to meet a requirement of a rapid increase of mobile data. At present, most low-band spectrum resources (for example, frequency bands below 3 GHz) that are suitable for mobile communication have been allocated. However, in frequency bands between 3 GHz and 300 GHz, a large quantity of spectrum resources have not been allocated for use. According to a definition by the International Telecommunication Union (International Telecommunication Union, ITU), the 3-30 GHz band is called a super high frequency (Super High Frequency, SHF) band, and the 30-300 GHz band is called an extremely high frequency (Extremely High Frequency, EHF) band. Because the SHF band and the EHF band have a similar propagation characteristic (a relatively high propagation loss) with a wavelength ranging from 1 millimeter to 100 millimeters, the bands between 3 GHz and 300 GHz are collectively referred to as a millimeter-wave frequency band. Extending to the millimeter-wave frequency band to explore usable frequency resources has become a common thinking of the industry.

By making use of characteristics of the millimeter-wave frequency band, in a millimeter-wave communications system, a millimeter-wave macro base station transmits control plane information and user plane information by using a millimeter-wave frequency band with a relatively low frequency (which is referred to as a low frequency band below and is generally a frequency band below 6 GHz, such as 3.5 GHz, or 5 GHz), and may cover a relatively large area. Both a small cell and a macro base station can transmit user plane information by using a relatively high millimeter-wave frequency band (which is referred to as a high frequency band below and is generally a frequency band above 6 GHz, such as 28 GHz, 38 GHz, or E-Band). In coverage of the macro base station, a millimeter-wave small cell is used for relay transmission, and multiple millimeter-wave small cells are deployed for hotspot coverage, where the millimeter-wave small cell covers a relatively small area by using a millimeter-wave frequency band with a relatively high frequency. A terminal in coverage of the millimeter-wave macro base station and in coverage of the millimeter-wave small cell may communicate with both the millimeter-wave small cell and the millimeter-wave macro base station by using one or more millimeter-wave frequency bands. In this way, a system capacity can be effectively improved, and real-time transmission of control signaling can be effectively guaranteed.

That a relay technology is used as a key technology component is proposed in both Long Term Evolution-Advanced (Long Term Evolution-Advanced, LTE-A) and Wireless Metropolitan Area Network-Advanced (Wireless MAN-Advanced). LTE-A is used as an example. A relay node (Relay Node, RN) implements all functions of a base station, and in a process of communicating with a donor evolved NodeB (Donor eNB, DeNB), needs to complete air interface information processing work similar to that of a terminal UE.

However, in an existing relay transmission solution, processing by a relay node is relatively complex. Air interface information processing is used as an example. Processing at various layers including Packet Data Convergence Protocol (Packet Data Convergence Protocol, PDCP), Radio Link Control (Radio Link Control, RLC), Media Access Control (Media Access Control, MAC), and the Physical Layer (Physical Layer, PHY) protocol needs to be performed. According to 3GPP evaluation, a required processing time is about 1.5 ms, and therefore, a time that needs to be consumed for one time of forwarding is longer than 3 ms. In requirements newly discussed by the ITU for a next-generation mobile communication system, it is proposed that a user plane processing delay that does not exceed 1 ms needs to be supported. Therefore, the existing solution cannot meet the delay requirement.

SUMMARY

The present invention provides a data transmission method and a base station, where a macro base station schedules network resources in a centralized manner, and performs unified encapsulation according to a scheduled transmission path, thereby effectively simplifying processing by a forwarding node, reducing a delay, and bringing good scalability.

A first aspect of the present invention provides a base station, where the base station includes:

a first processing unit, configured to determine, according to channel state information CSI, a transmission path for forwarding first data to a first terminal, such that when the first processing unit determines that the first data needs to be forwarded by at least one small cell to the first terminal, the transmission path includes a path from the base station to a small cell and a path from the small cell to the first terminal; and a second processing unit, configured to send, according to the transmission path determined by the first processing unit, a first data frame to the first terminal via the at least one small cell, wherein the first data frame includes resource assignment information and the first data, and the resource assignment information indicates resource assignment from the base station to the small cell and resource assignment from the small cell to the first terminal.

With reference to the first aspect, in a first possible implementation manner of the first aspect, the second processing unit specifically includes:

an encapsulation unit, configured to perform information encapsulation for the first data according to the transmission path determined by the first processing unit, to obtain backhaul link data, where the backhaul link data is data that needs to be forwarded by at least one small cell;

a frame assembly unit, configured to assemble the first data frame by using the resource assignment information and the backhaul link data obtained by the encapsulation unit; and a sending unit, configured to send the first data frame assembled by the frame assembly unit to a small cell in the transmission path, where the small cell is a next hop of the base station, to enable the small cell to assemble a second data frame and sends the second data frame to the first terminal, or sends the second data frame to a next next-hop small cell, where the next next-hop small cell forwards the second data frame to the first terminal.

With reference to the first possible implementation manner of the first aspect, in a second possible implementation manner of the first aspect, when the first processing unit determines the first data is to be forwarded by one small cell to the first terminal, the backhaul link data in the first data frame assembled by the frame assembly unit includes access link data in the second data frame, and the first data is the access link data in the second data frame; or when the first processing unit determines that the first data needs to be forwarded by at least two small cells to the first terminal, the backhaul link data in the first data frame assembled by the frame assembly unit includes backhaul link data in the second data frame, and the first data is the backhaul link data in the second data frame.

With reference to the second possible implementation manner of the first aspect, in a third possible implementation manner of the first aspect, the first data frame assembled by the frame assembly unit includes a control part and a data part, the resource assignment information is the control part, and the first data is the data part; and the resource assignment information in the first data frame further includes a type identifier information indicating a resource assignment manner of the control part and a type identifier information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame.

With reference to the third possible implementation manner of the first aspect, in a fourth possible implementation manner of the first aspect, the resource assignment information in the first data frame assembled by the frame assembly unit further indicates a mapping method for the small cell that receives the first data frame to assemble the second data frame, so that the small cell performs mapping according to the mapping method to assemble the second data frame.

With reference to the first aspect, in a fifth possible implementation manner of the first aspect, the sending unit is further configured to: before the first processing unit determines, according to the channel state information CSI, the transmission path for forwarding the first data to the first terminal, send a CSI scheduling message to a terminal or a small cell within a service range of the base station; and the base station further includes: a receiving unit, configured to receive a CSI feedback by the terminal or the small cell, where the CSI scheduling message includes a specific frequency band at which the terminal or the small cell measures the CSI and a feedback manner that are configured by the base station, and the CSI feedback by the small cell includes CSI obtained by the small cell by means of measurement, CSI sent by another small cell to the small cell and forwarded by the small cell to the base station, or CSI sent by another terminal to the small cell and forwarded by the small cell to the base station.

With reference to the fifth possible implementation manner of the first aspect, in a sixth possible implementation manner of the first aspect, the CSI scheduling message sent by the sending unit specifically includes first indication information, where the first indication information is used to instruct the terminal to feed back the CSI to the small cell at a specified frequency band and forward the CSI to the base station in a data form via the small cell, so that the terminal that receives the CSI scheduling message feeds back the CSI in a manner indicated by the first indication information.

With reference to the first aspect, in a seventh possible implementation manner of the first aspect, the first data frame is transmitted by using a user plane protocol stack, and the user plane protocol stack is formed by only a physical layer PHY layer.

With reference to the first aspect, in an eighth possible implementation manner of the first aspect, the base station is a millimeter-wave macro base station, an evolved NodeB eNodeB, or a NodeB.

According to a second aspect, the present invention further provides a small cell, where the small cell includes:

a receiving unit, configured to receive a first data frame sent by a previous-hop node, where the first data frame includes resource assignment information and data, the data includes at least backhaul link data, the backhaul link data includes first data to be sent to a first terminal, the resource assignment information includes at least backhaul data resource assignment information, and the backhaul data resource assignment information includes resource assignment information from the small cell to the first terminal;

a processing unit, configured to assemble a second data frame by using the backhaul link data in the first data frame received by the receiving unit, where the second data frame includes resource assignment information and data, the data in the second data frame includes at least one of the following: access link data and backhaul link data, the resource assignment information in the second data frame includes at least one of the following: access data resource assignment information and backhaul data resource assignment information, the access link data in the second data frame includes data of a terminal served by the small cell in the backhaul link data in the first data frame, and the backhaul link data in the second data frame is data that needs to be forwarded by a next-hop node in the backhaul link data in the first data frame, where if the first terminal is a terminal served by the small cell, the first data is the access link data in the second data frame; or if the first terminal is a terminal served by another small cell, the first data is the backhaul link data in the second data frame; and a sending unit, configured to send the second data frame assembled by the processing unit to the next-hop node or the terminal served by the small cell.

With reference to the second aspect, in a first possible implementation manner of the second aspect, the first data frame or the second data frame includes a control part and a data part, the resource assignment information is the control part, and the backhaul link data or the access link data is the data part;

the resource assignment information in the first data frame further includes a type identifier information indicating a resource assignment manner of the control part and a type identifier information indicating a resource assignment manner of the data part; and the processing unit is specifically configured to: according to the type identifiers and the information indicating the resource assignment manners, map information in the control part in the backhaul link data in the first data frame to the control part of the second data frame, and map information in the data part in the backhaul link data in the first data frame to the data part of the second data frame, to assemble the second data frame.

With reference to the first possible implementation manner of the second aspect, in a second possible implementation manner of the second aspect, the resource assignment information in the first data frame further indicates a mapping method for the small cell to assemble the second data frame; and the processing unit is specifically configured to perform mapping according to the mapping method to assemble the second data frame.

With reference to the second aspect, in a third possible implementation manner of the second aspect, the first data frame or the second data frame is transmitted by using a user plane protocol stack, and the user plane protocol stack is formed by only a physical layer PHY layer.

With reference to the second aspect, in a fourth possible implementation manner of the second aspect, the receiving unit is further configured to receive a CSI scheduling message sent by a base station or CSI sent by another node or another terminal; and the processing unit feeds back, according to the CSI scheduling message received by the receiving unit, CSI obtained by means of measurement to the base station by using the sending unit; or the processing unit forwards the CSI received by the receiving unit to the base station, where the CSI received by the receiving unit includes CSI sent by the another small cell to the small cell or CSI sent by the another terminal to the small cell.

With reference to the second aspect or any one of the first to the fourth possible implementation manners of the second aspect, in a fifth possible implementation manner of the second aspect, the previous-hop node is the base station or a small cell, and the next-hop node is a small cell.

With reference to the second aspect or any one of the first to the fourth possible implementation manners of the second aspect, in a sixth possible implementation manner of the second aspect, the small cell is a millimeter-wave small cell, a relay node RN, a pico cell, or a femto cell.

According to a third aspect, the present invention further provides a data transmission method, where the method includes:

determining, by a base station according to channel state information CSI, a transmission path for forwarding first data to a first terminal, where if the base station determines that the first data needs to be forwarded by at least one small cell to the first terminal, the transmission path includes a path from the base station to a small cell and a path from the small cell to the first terminal; and sending, by the base station according to the transmission path, a first data frame to the first terminal via the at least one small cell, where the first data frame includes resource assignment information and the first data, and the resource assignment information includes resource assignment information from the base station to the small cell and resource assignment information from the small cell to the first terminal.

With reference to the third aspect, in a first possible implementation manner of the third aspect, the sending, by the base station according to the transmission path, a first data frame to the first terminal via the at least one small cell specifically includes:

performing, by the base station, information encapsulation for the first data according to the transmission path, to obtain backhaul link data, where the backhaul link data is data that needs to be forwarded by at least one small cell;

assembling, by the base station, the first data frame by using the resource assignment information and the backhaul link data; and sending, by the base station, the first data frame to a small cell in the transmission path, where the small cell is a next hop of the base station, to enable the small cell to assemble a second data frame and sends the second data frame to the first terminal, or sends the second data frame to a next next-hop small cell, where the next next-hop small cell forwards the second data frame to the first terminal.

With reference to the first possible implementation manner of the third aspect, in a second possible implementation manner of the third aspect, if the base station determines the first data is to be forwarded by one small cell to the first terminal, the backhaul link data in the first data frame includes access link data in the second data frame, and the first data is the access link data in the second data frame; or if the base station determines that the first data needs to be forwarded by at least two small cells to the first terminal, the backhaul link data in the first data frame includes backhaul link data in the second data frame, and the first data is the backhaul link data in the second data frame.

With reference to the second possible implementation manner of the third aspect, in a third possible implementation manner of the third aspect, the first data frame includes a control part and a data part, the resource assignment information is the control part, and the first data is the data part; and the resource assignment information in the first data frame further includes a type identifier information indicating a resource assignment manner of the control part and a type identifier information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame.

With reference to the third possible implementation manner of the third aspect, in a fourth possible implementation manner of the third aspect, the resource assignment information in the first data frame further indicates a mapping method for the small cell that receives the first data frame to assemble the second data frame, so that the small cell performs mapping according to the mapping method to assemble the second data frame.

With reference to the third aspect, in a fifth possible implementation manner of the third aspect, before the determining, by a base station according to channel state information CSI, a transmission path for forwarding first data to a first terminal, the method further includes:

sending, by the base station, a CSI scheduling message to a terminal or a small cell within a service range of the base station, and receiving the CSI feedback by the terminal or the small cell, where the CSI scheduling message includes a specific frequency band at which the terminal or the small cell measures the CSI and a feedback manner that are configured by the base station, and the CSI feedback by the small cell includes CSI measured by the small cell, CSI sent by another small cell to the small cell and forwarded by the small cell to the base station, or CSI sent by another terminal to the small cell and forwarded by the small cell to the base station.

With reference to the fifth possible implementation manner of the third aspect, in a sixth possible implementation manner of the third aspect, the CSI scheduling message specifically includes first indication information, where the first indication information is used to instruct the terminal to feed back the CSI to the small cell at a specified frequency band and forward the CSI to the base station in a data form via the small cell, so that the terminal that receives the CSI scheduling message feeds back the CSI in a manner indicated by the first indication information.

With reference to the third aspect, in a seventh possible implementation manner of the third aspect, the first data frame is transmitted by using a user plane protocol stack, and the user plane protocol stack is formed by only a physical layer PHY layer.

According to a fourth aspect, the present invention further provides a data transmission method, where the method includes:

receiving, by a current node, a first data frame sent by a previous-hop node, where the first data frame includes resource assignment information and data, the data includes at least backhaul link data, the backhaul link data includes first data to be sent to a first terminal, the resource assignment information includes at least backhaul data resource assignment information, and the backhaul data resource assignment information indicates resource assignment from the current node to the first terminal;

assembling, by the current node, a second data frame by using the backhaul link data in the first data frame, wherein the second data frame includes resource assignment information and data, the data in the second data frame includes at least one of the following: access link data and backhaul link data, the resource assignment information in the second data frame includes at least one of the following: access data resource assignment information and backhaul data resource assignment information, the access link data in the second data frame is data of a terminal served by the current node in the backhaul link data in the first data frame, and the backhaul link data in the second data frame is data that needs to be forwarded by a next-hop node in the backhaul link data in the first data frame, where if the first terminal is a terminal served by the current node, the first data is the access link data in the second data frame; or if the first terminal is a terminal served by another node, the first data is the backhaul link data in the second data frame; and sending, by the current node, the second data frame to the next-hop node or the terminal served by the current node.

With reference to the fourth aspect, in a first possible implementation manner of the fourth aspect, the first data frame or the second data frame includes a control part and a data part, the resource assignment information is the control part, and the backhaul link data or the access link data is the data part;

the resource assignment information in the first data frame further includes a type identifier information indicating a resource assignment manner of the control part and a type identifier information indicating a resource assignment manner of the data part; and the assembling, by the current node, a second data frame by using the backhaul link data in the first data frame specifically includes:

according to the type identifiers and the information indicating the resource assignment manners, mapping, by the current node, information in the control part in the backhaul link data in the first data frame to the control part of the second data frame, and mapping information in the data part in the backhaul link data in the first data frame to the data part of the second data frame, to assemble the second data frame.

With reference to the first possible implementation manner of the fourth aspect, in a second possible implementation manner of the fourth aspect, the resource assignment information in the first data frame further indicates a mapping method for the current node to assemble the second data frame; and the current node performs mapping according to the mapping method to assemble the second data frame.

With reference to the fourth aspect, in a third possible implementation manner of the fourth aspect, the first data frame or the second data frame is transmitted by using a user plane protocol stack, and the user plane protocol stack is formed by only a physical layer PHY layer.

With reference to the fourth aspect, in a fourth possible implementation manner of the fourth aspect, before the receiving, by a current node, a first data frame sent by a previous-hop node, the method further includes:

receiving, by the current node, a CSI scheduling message sent by a base station, and feeding back, according to the CSI scheduling message, CSI obtained by means of measurement to the base station, or forwarding CSI received by the current node to the base station, where the CSI received by the current node includes CSI sent by another small cell to the current node or CSI sent by a terminal to the current node.

With reference to the fourth aspect or any one of the first to the fourth possible implementation manners of the fourth aspect, in a fifth possible implementation manner of the fourth aspect, the current node is a small cell, the previous-hop node is the base station or a small cell, and the next-hop node is a small cell.

According to a fifth aspect, an embodiment of the present invention further provides a base station, where the base station includes: a processor and a transmitter, where the transmitter is configured to send data to a terminal, another base station, or a small cell; and the processor is configured to:

determine, according to channel state information CSI, a transmission path for forwarding first data to a first terminal, where if the base station determines that the first data needs to be forwarded by at least one small cell to the first terminal, the transmission path includes a path from the base station to a small cell and a path from the small cell to the first terminal; and send, according to the transmission path by using the transmitter, a first data frame to the first terminal via the at least one small cell, where the first data frame includes resource assignment information and the first data, and the resource assignment information includes resource assignment information from the base station to the small cell and resource assignment information from the small cell to the first terminal.

With reference to the fifth aspect, in a first possible implementation manner of the fifth aspect, that the processor is configured to send, according to the transmission path by using the transmitter, a first data frame to the first terminal via the at least one small cell specifically includes:

the processor is configured to: perform information encapsulation for the first data according to the transmission path, to obtain backhaul link data, where the backhaul link data is data that needs to be forwarded by at least one small cell;

assemble the first data frame by using the resource assignment information and the backhaul link data; and send the first data frame to a small cell in the transmission path, where the small cell is a next hop of the base station by using the transmitter, to enable the small cell to assemble a second data frame and sends the second data frame to the first terminal, or sends the second data frame to a next next-hop small cell, where the next next-hop small cell forwards the second data frame to the first terminal.

With reference to the first possible implementation manner of the fifth aspect, in a second possible implementation manner of the fifth aspect, if the processor determines the first data is to be forwarded by one small cell to the first terminal, the backhaul link data in the first data frame includes access link data in the second data frame, and the first data is the access link data in the second data frame; or if the processor determines that the first data needs to be forwarded by at least two small cells to the first terminal, the backhaul link data in the first data frame includes backhaul link data in the second data frame, and the first data is the backhaul link data in the second data frame.

With reference to the second possible implementation manner of the fifth aspect, in a third possible implementation manner of the fifth aspect, the first data frame includes a control part and a data part, the resource assignment information is the control part, and the first data is the data part; and the resource assignment information in the first data frame further includes a type identifier information indicating a resource assignment manner of the control part and a type identifier information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame.

With reference to the third possible implementation manner of the fifth aspect, in a fourth possible implementation manner of the fifth aspect, the resource assignment information in the first data frame further indicates a mapping method for the small cell that receives the first data frame to assemble the second data frame, so that the small cell performs mapping according to the mapping method to assemble the second data frame.

With reference to the fifth aspect, in a fifth possible implementation manner of the fifth aspect, the base station further includes: a receiver, configured to receive data sent by the terminal, the another base station, or the small cell; and before the base station determines, according to the channel state information CSI, the transmission path for forwarding the first data to the first terminal, the processor is further configured to:

send a CSI scheduling message to a terminal or a small cell within a service range of the base station by using the transmitter, and receive, by using the receiver, the CSI feedback by the terminal or the small cell, where the CSI scheduling message includes a specific frequency band at which the terminal or the small cell measures the CSI and a feedback manner that are configured by the base station, and the CSI feedback by the small cell includes CSI measured by the small cell, CSI sent by another small cell to the small cell and forwarded by the small cell to the base station, or CSI sent by another terminal to the small cell and forwarded by the small cell to the base station.

With reference to the fifth possible implementation manner of the fifth aspect, in a sixth possible implementation manner of the fifth aspect, the CSI scheduling message specifically includes first indication information, where the first indication information is used to instruct the terminal to feed back the CSI to the small cell at a specified frequency band and forward the CSI to the base station in a data form via the small cell, so that the terminal that receives the CSI scheduling message feeds back the CSI in a manner indicated by the first indication information.

With reference to the fifth aspect, in a seventh possible implementation manner of the fifth aspect, the first data frame is transmitted by using a user plane protocol stack, and the user plane protocol stack is formed by only a physical layer PHY layer.

According to a sixth aspect, the present invention further provides a small cell, where the small cell includes: a processor, a receiver, and a transmitter, where the receiver is configured to receive data sent by a previous-hop node or a next-hop node;

the transmitter is configured to send data to the previous-hop node or the next-hop node; and the processor is configured to:

receive, by using the receiver, a first data frame sent by the previous-hop node, where the first data frame includes resource assignment information and data, the data includes at least backhaul link data, the backhaul link data includes first data to be sent to a first terminal, the resource assignment information includes at least backhaul data resource assignment information, and the backhaul data resource assignment information includes resource assignment information from the small cell to the first terminal;

assemble the second data frame by using the backhaul link data in the first data frame, where the second data frame includes resource assignment information and data, the data in the second data frame includes at least one of the following: access link data and backhaul link data, the resource assignment information in the second data frame includes at least one of the following: access data resource assignment information and backhaul data resource assignment information, the access link data in the second data frame includes data of a terminal served by the small cell in the backhaul link data in the first data frame, and the backhaul link data in the second data frame is data that needs to be forwarded to the terminal by the next-hop node in the backhaul link data in the first data frame, where if the first terminal is a terminal served by the small cell, the first data is the access link data in the second data frame; or if the first terminal is a terminal served by another small cell, the first data is the backhaul link data in the second data frame; and send, by using the transmitter, the second data frame to the next-hop node or the terminal served by the small cell.

With reference to the sixth aspect, in a first possible implementation manner of the sixth aspect, the first data frame or the second data frame includes a control part and a data part, the resource assignment information is the control part, and the backhaul link data or the access link data is the data part;

the resource assignment information in the first data frame further includes a type identifier information indicating a resource assignment manner of the control part and a type identifier information indicating a resource assignment manner of the data part; and that the processor is configured to assemble a second data frame by using the backhaul link data in the first data frame specifically includes:

the processor is configured to: according to the type identifiers and the information indicating the resource assignment manners, map information in the control part in the backhaul link data in the first data frame to the control part of the second data frame, and map information in the data part in the backhaul link data in the first data frame to the data part of the second data frame, to assemble the second data frame.

With reference to the first possible implementation manner of the sixth aspect, in a second possible implementation manner of the sixth aspect, the resource assignment information in the first data frame further indicates a mapping method for the small cell to assemble the second data frame; and the processor is specifically configured to perform mapping according to the mapping method to assemble the second data frame.

With reference to the sixth aspect, in a third possible implementation manner of the sixth aspect, the first data frame or the second data frame is transmitted by using a user plane protocol stack, and the user plane protocol stack is formed by only a physical layer PHY layer.

With reference to the sixth aspect, in a fourth possible implementation manner of the sixth aspect, before the receiving, by using the receiver, a first data frame sent by the previous-hop node, the processor is further configured to:

receive, by using the receiver, a CSI scheduling message sent by a base station, and feedback, according to the CSI scheduling message by using the transmitter, CSI obtained by means of measurement to the base station, or forward, by using the transmitter, CSI received by the small cell by using the receiver to the base station, where the CSI received by the small cell by using the receiver includes CSI sent by the another small cell to the small cell or CSI sent by the another terminal to the current node.

With reference to the sixth aspect or any one of the first to the fourth possible implementation manners of the sixth aspect, in a fifth possible implementation manner of the sixth aspect, the previous-hop node is the base station or a small cell, and the next-hop node is a small cell.

According to the data transmission method and the base station provided in the present invention, the base station schedules, in a centralized manner, according to CSI information, all radio resources that can be used in an entire network, and encapsulates, by means of information encapsulation, backhaul data transmitted via a small cell into a data part on a previous-hop node for transmission, thereby effectively simplifying processing by a forwarding node, reducing a delay, and bringing good scalability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A data transmission method and a base station provided in the embodiments of the present invention can be used in a communications system with transmission via a relay node, and in particular, in a millimeter-wave communications system in which a control plane is separated from a user plane, and can implement multi-hop relay transmission; or may be used in multi-hop relay transmission in which data transmitted by a base station needs to be forwarded by multiple relay nodes (small cells) to a terminal. The base station in the embodiments of the present invention may be a millimeter-wave macro base station or a radio communication base station that operates at another radio communication frequency band, for example, a base station such as an evolved NodeB eNodeB or a NodeB; the small cell may be a millimeter-wave small cell or a radio communication small cell that operates at another radio communication frequency band, for example, a small cell such as a relay node RN, a pico cell, or a femto cell. For a base station such as an evolved NodeB eNodeB or a NodeB, multi-hop relay transmission refers to forwarding performed by using a relay node RN as a small cell. That is, for all multi-hop relay transmission, the data transmission method provided in the embodiments of the present invention may be used, and a difference lies only in that frequency bands used for transmitting data are different. The embodiments of the present invention are not limited to a millimeter-wave communications system in which a high frequency band is used for transmission. Lower-frequency transmission, for example, that using a frequency spectrum of a low frequency band (a frequency band below 3 GHz) in mobile communication, may also be implemented by using the data transmission method provided in the embodiments of the present invention.

In the embodiments of the present invention, a millimeter-wave communications system is used as an example for description. The base station mentioned in the following is a millimeter-wave macro base station, and the small cell mentioned in the following is a millimeter-wave small cell.

Figure 1:
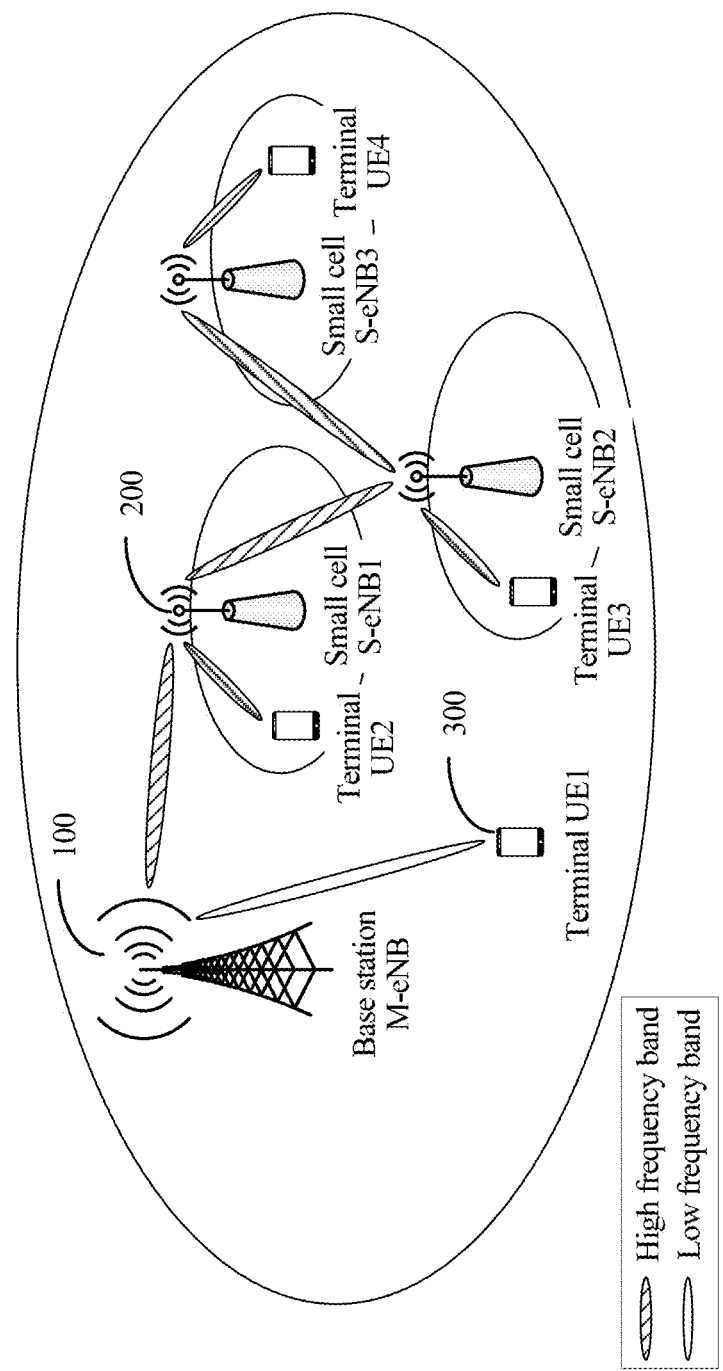
FIG. 1 is a schematic diagram of a millimeter-wave communications system according to an embodiment of the present invention.

FIG. 1 is a schematic diagram of a millimeter-wave communications system according to an embodiment of the present invention. As shown in FIG. 1, the system includes: a base station 100, multiple small cells 200, and multiple terminals 300. In coverage of the base station 100 (a millimeter-wave macro base station), downlink data of a terminal 300 is delivered from a core network to the base station 100, and the base station 100 directly transmits the downlink data to the terminal 300 by using a lower millimeter-wave frequency band (a low frequency band), or the base station 100 first transmits the downlink data to a small cell 200 by using a higher millimeter-wave frequency band (a high frequency band) or a wired optical fiber, and then the small cell 200 transmits the downlink data to a terminal 300 by using a higher millimeter-wave frequency band (a high frequency band), or the downlink data may be relayed by multiple small cells 200 to a terminal 300.

Figure 2:
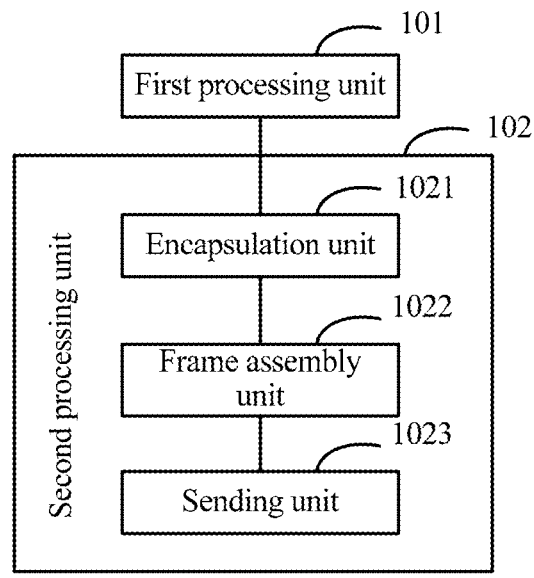
FIG. 2 is a schematic structural diagram of a base station according to an embodiment of the present invention.

FIG. 2 is a schematic structural diagram of a base station 100 according to an embodiment of the present invention. As shown in FIG. 2, the base station 100 in this embodiment of the present invention includes: a first processing unit 101 and a second processing unit 102.

The first processing unit 101 is a scheduling and assignment unit of the base station 100 and is configured to perform resource scheduling and assignment for to-be-transmitted data according to channel state information (channel state information, CSI) to determine a transmission path through which the to-be-transmitted data arrives at a terminal, so as to obtain resource assignment information.

The to-be-transmitted data may include first data that needs to be forwarded to a first terminal. For the first data that needs to be forwarded to the first terminal, the first processing unit 101 is configured to determine, according to the CSI, a transmission path for forwarding the first data to the first terminal.

When the first processing unit 101 determines that the first data needs to be forwarded by at least one small cell to the first terminal, the transmission path includes a path from the base station 100 to a small cell 200 and a path from the small cell 200 to the first terminal.

In addition to the first data, the to-be-transmitted data of the base station 100 may include data to be sent to another terminal. The first processing unit 101 determines, according to the CSI, transmission paths through which all the to-be-transmitted data arrives at terminals (destination terminals) of all the data, including a path from the base station to a small cell and a path from the small cell to a terminal. In this case, the resource assignment information obtained by the first processing unit 101 may indicate resource assignment from the base station to the small cell, resource assignment from the small cell to the terminal, or resource assignment of a link from the base station to the terminal.

In a communications system, the to-be-transmitted data may be classified into access link data and backhaul link data. The access link data refers to data that is directly transmitted between a base station or a small cell and a terminal without being further forwarded by another small cell. The backhaul link data refers to data that is transmitted between base stations, between a base station and a small cell, or between small cells.

Accordingly, the resource assignment information obtained by the first processing unit 101 may include access data resource assignment information or backhaul data resource assignment information.

In a millimeter-wave communications system, user plane information of a terminal 300 may be sent to the terminal 300 by the base station 100 (a macro base station) by using a low frequency band, or may be sent to the small cell 200 by the base station 100 by using a high frequency band and then is forwarded to the terminal 300.

Figure 3:
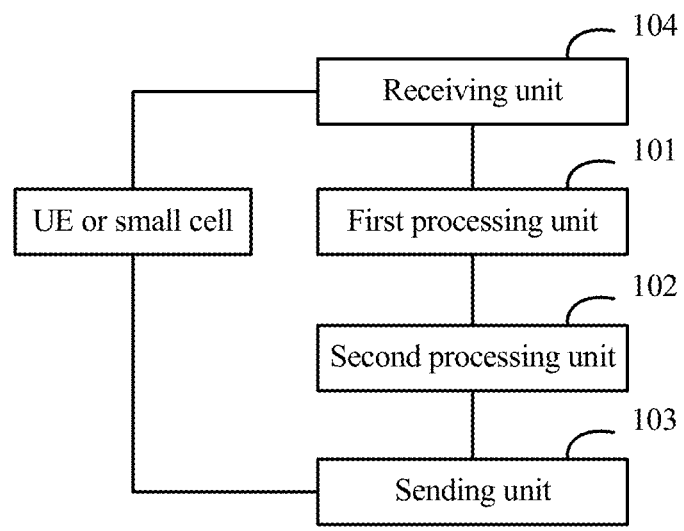
FIG. 3 is a schematic structural diagram of another base station according to an embodiment of the present invention.

The terminal 300 needs to feed back to the base station 100 measured CSI that includes CSI of the high frequency band and/or CSI of the low frequency band. In addition, the small cell 200 also needs to feed back CSI of the low frequency band and CSI of the high frequency band to the base station 100 by using the low frequency band. Therefore, as shown in FIG. 3, the base station 100 further includes: a sending unit 103 and a receiving unit 104. The sending unit 103 is configured to: before the first processing unit 101 performs resource scheduling and assignment for the to-be-transmitted data according to the channel state information CSI, send a CSI scheduling message to the terminal 300 or the small cell 200 within a service range of the base station. The receiving unit 104 is configured to receive the CSI feedback by the terminal 300 or the small cell 200.

Optionally, the base station 100 may further configure a specific frequency band at which the terminal 300 or the small cell 200 performs measurement and a feedback manner. Therefore, the CSI scheduling message sent by the sending unit 103 includes the specific frequency band at which the terminal or the small cell measures the CSI and the feedback manner that are configured by the base station 100.

The CSI scheduling message sent by the sending unit 103 may specifically include first indication information, where the first indication information is used to instruct the terminal 300 to feed back the CSI to the small cell 200 at a specified frequency band (a high frequency band) and forward the CSI to the base station 100 in a data form via the small cell 200, so that the terminal that receives the CSI scheduling message feeds back the CSI in a manner indicated by the first indication information.

The CSI feedback by the small cell 200 includes at least one of the following:
CSI measured by the small cell;
CSI sent by another small cell to the small cell and forwarded by the small cell to the base station; or
CSI sent by another terminal to the small cell and forwarded by the small cell to the base station.

Specifically, the CSI scheduling message may be carried in higher layer signaling or link resource assignment information. A base station M-eNB may instruct, by using higher layer radio resource control (Radio Resource Control, RRC) signaling or PHY layer uplink resource assignment information, a terminal to feed back CSI information in a high frequency band, and an S-eNB forwards, to the M-eNB in a data form, the CSI information feedback by the terminal. Alternatively, an M-eNB may instruct, by using higher layer RRC signaling or PHY layer uplink resource assignment information, a terminal to feed back CSI information in a low frequency band, and the CSI information feedback by the terminal is directly sent to the M-eNB in a form of data or control information.

In this way, the base station may instruct the terminal to feed back, by means of small cell forwarding, the CSI in a data form by using a high frequency band channel, so that control plane resources can be reduced.

The first processing unit 101 performs resource scheduling and assignment for the to-be-transmitted data according to the CSI feedback by the terminal 300 or the small cell 200. As shown in FIG. 1, in coverage of the base station M-eNB, transmission between a terminal UE and a small cell S-eNB is controlled by the base station M-eNB with centralized scheduling and assignment.

It can be learned from FIG. 1 that if the to-be-transmitted data includes data to be transmitted to four terminals (UE1 to UE4), the first processing unit 101 determines, according to related CSIs such as channel qualities, channel delays, and a quantity of channels, transmission paths through which the to-be-transmitted data arrives at the terminals. For example, the first processing unit 101 determines to directly transmit data of UE1 to UE1 by using a low frequency band channel, transmit data of UE2 to UE2 by means of forwarding by a small cell S-eNB1, transmit data of UE3 to UE3 by means of forwarding by small cells S-eNB1 and S-eNB2, and transmit data of UE4 to UE4 by means of forwarding by small cells S-eNB1, S-eNB2, and S-eNB3, so as to obtain resource assignment information.

The access link data of the base station M-eNB 100 includes the data of UE1, and the backhaul link data of the base station M-eNB 100 includes the data of UE2, UE3, and UE4.

It can be learned that the resource assignment information in the foregoing example includes access data resource assignment information and backhaul data resource assignment information. The access data resource assignment information of the base station 100 includes assignment information of resources transmitting the data of UE1. The backhaul data resource assignment information of the base station 100 includes assignment information of resources transmitting the data of UE2, UE3, and UE4 by means of small cell forwarding.

Still referring to FIG. 2, the second processing unit 102 is configured to: according to the transmission path determined by the first processing unit 101, send a first data frame to the terminal, or send a first data frame to the terminal via the at least one small cell.

The first data frame includes the resource assignment information and the to-be-transmitted data.

When the to-be-transmitted data includes the first data that needs to be forwarded to the first terminal, the first data frame may include the resource assignment information and the first data, where the resource assignment information includes resource assignment information from the base station to a small cell and resource assignment information from the small cell to the first terminal. The second processing unit 102 is configured to send the first data frame to the first terminal via the at least one small cell.

In addition to the first data, the to-be-transmitted data may further include data to be sent to another terminal, that is, the first data frame may include data to be sent to all terminals. Therefore, according to the transmission path determined by the first processing unit 101, the second processing unit 102 directly sends the first data frame to the terminal, or sends the first data frame to the terminal by means of forwarding by the at least one small cell.

Specifically, the second processing unit 102 may include an encapsulation unit 1021, a frame assembly unit 1022, and a sending unit 1023.

The encapsulation unit 1021 is configured to perform information encapsulation for the to-be-transmitted data according to the transmission path determined by the first processing unit 101, to obtain backhaul link data by using data that needs to be forwarded to the terminal by the at least one small cell, and obtain access link data by using data of the terminal served by the base station. In this way, the to-be-transmitted data in the first data frame may include the access link data or the backhaul link data.

For the base station, the access link data is the data of the terminal served by the base station in the to-be-transmitted data, and the backhaul link data is the data that needs to be forwarded for one or more times by one or more small cells to the terminal in the to-be-transmitted data. Because the to-be-transmitted data may need to be forwarded by multiple small cells, in this embodiment of the present invention, forwarding by one small cell is one time of forwarding, and forwarding by multiple small cells is multiple times of forwarding.

For the first data that needs to be forwarded to the first terminal by the at least one small cell, the encapsulation unit 1021 is configured to perform information encapsulation for the first data according to the transmission path determined by the first processing unit 101, to obtain backhaul link data.

The frame assembly unit 1022 is configured to assemble the first data frame by using the access link data or the backhaul link data and the corresponding resource assignment information.

The first data frame assembled by the frame assembly unit 1022 includes a control part and a data part, the resource assignment information is the control part, and the access link data or the backhaul link data (that is, the to-be-transmitted data) is the data part. For the first data that needs to be forwarded to the first terminal by the at least one small cell, the first data is the backhaul link data.

In an example in which the backhaul link data includes the data transmitted to UE2, UE3, and UE4 in FIG. 1, the data transmitted to UE2, UE3, and UE4 needs to be forwarded by one or more small cells (S-eNB1, S-eNB2, and S-eNB3), the encapsulation unit 1021 of the second processing unit 102 performs information encapsulation for this part of data according to the transmission path, to obtain the backhaul link data in the first data frame, and the frame assembly unit 1022 uses corresponding related resource assignment information as the backhaul data resource assignment information, to obtain the first data frame.

UE1 is a terminal served by the base station 100, and therefore, the data transmitted to UE1 is directly sent to UE1 by the base station 100 without being forwarded by a small cell. The encapsulation unit 1021 of the second processing unit 102 uses this part of data as the access link data in the first data frame, and the frame assembly unit 1022 uses corresponding related resource assignment information as the access data resource assignment information, to obtain the first data frame.

If the to-be-transmitted data of the base station 100 includes both access link data and backhaul link data, after the encapsulation unit 1021 of the second processing unit 102 obtains the access link data and the backhaul link data, respectively, the frame assembly unit 1022 assembles the first data frame by using the access link data and the backhaul link data together. In this way, the first data frame includes the backhaul data resource assignment information, the backhaul link data, the access data resource assignment information, and the access link data.

Figure 4:
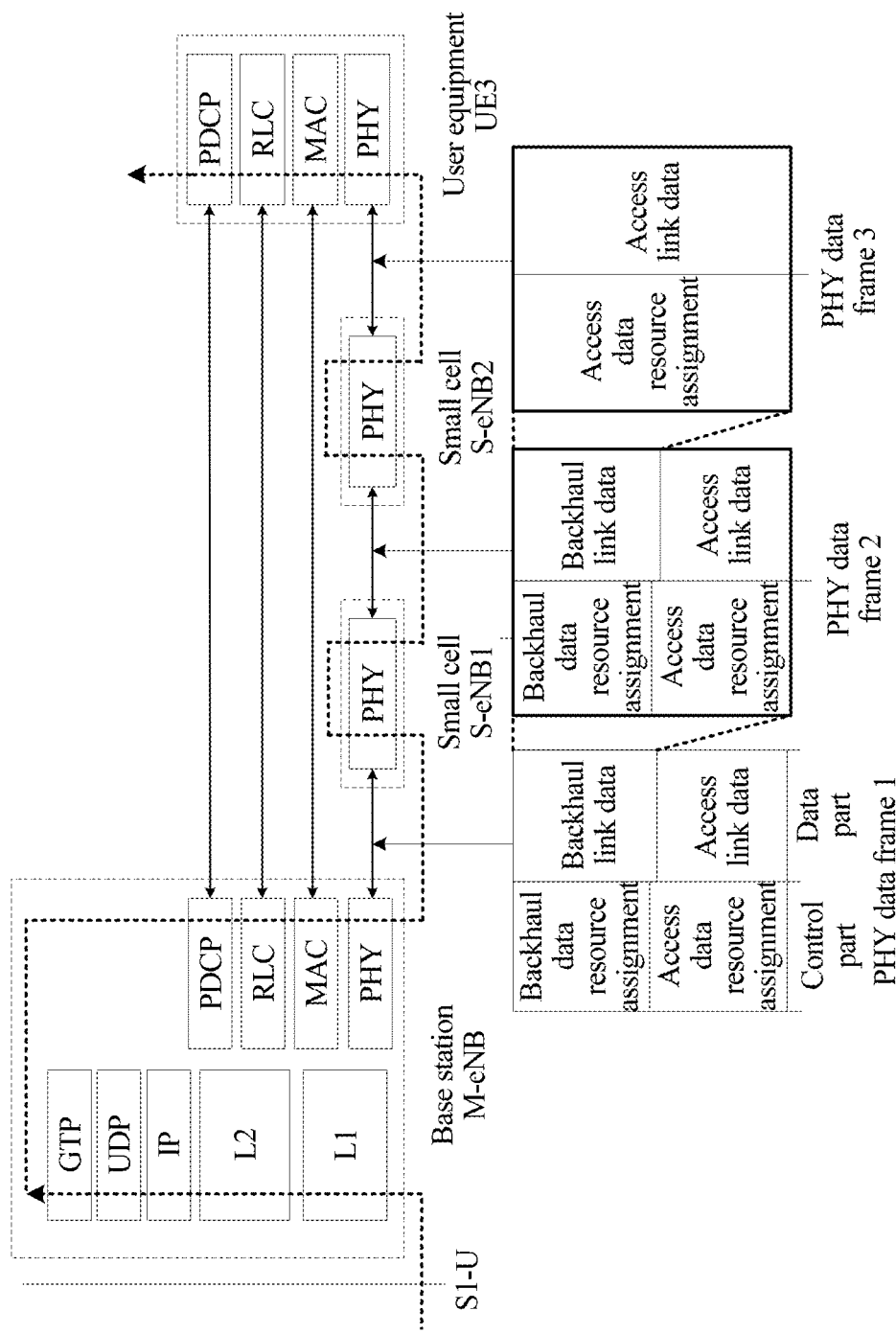
FIG. 4 is a schematic diagram of a protocol stack and a data frame in a data transmission method according to an embodiment of the present invention.

A specific data frame structure is shown in FIG. 4, the first data frame (a PHY data frame 1) assembled by the frame assembly unit includes the backhaul data resource assignment information, the backhaul link data, the access data resource assignment information, and the access link data.

The first data frame is transmitted by using a user plane protocol stack, and the user plane protocol stack is formed by only a physical layer PHY layer, as shown in FIG. 4. In the base station M-eNB, a protocol stack includes L1, L2, an Internet Protocol IP layer, a User Data Protocol UDP layer, a GPRS Tunneling Protocol GTP, PDCP layer, an RLC layer, a MAC layer, and a PHY layer. In a process of communication between the base station and the small cell, a protocol stack of a data frame is formed by only a PHY layer. Because the protocol stack is formed by only the PHY layer, a forwarding node needs to perform parsing processing and forwarding processing at only the PHY layer during forwarding, and does not need to perform parsing processing on a PDCP layer, an RLC layer, a MAC layer, or the like. Therefore, processing required by the forwarding node can be effectively simplified, a time required for parsing processing and forwarding processing is reduced, and a delay is reduced.

The sending unit 1023 is configured to send the first data frame assembled by the frame assembly unit to the terminal served by the base station, or send the first data frame to the small cell.

For the first data that needs to be forwarded to the first terminal by the at least one small cell, the sending unit 1023 is configured to send the first data frame assembled by the frame assembly unit to a small cell in the transmission path, where the small cell is a next hop of the base station, to enable the small cell to assemble a second data frame and sends the second data frame to the first terminal, or sends the second data frame to a next next-hop small cell, where the next next-hop small cell forwards the second data frame to the first terminal.

When the to-be-transmitted data includes data of multiple terminals, the sending unit 1023 sends the first data frame to the terminal served by the base station, or sends the first data frame to the small cell.

It should be noted that the sending unit 1023 and the sending unit 103 in FIG. 3 may be a same unit.

After receiving the first data frame, the terminal served by the base station and the small cell perform different processing. The first data frame sent to the small cell further needs to be forwarded after being processed by the small cell, and is forwarded for one or more times until all the to-be-transmitted data is sent to the corresponding destination terminals, which specifically includes:

when receiving the first data frame, the terminal served by the base station acquires the access link data from the first data frame. As shown in FIG. 1, the terminal UE1 receives the first data frame sent by the base station 100, and acquires the access link data from the first data frame, that is, the data sent to the terminal UE1.

When receiving the first data frame, the small cell acquires the backhaul link data from the first data frame, and then forwards the backhaul link data to a terminal served by the small cell or a next small cell. The small cell that receives the first data frame acquires the backhaul link data from the first data frame, and assembles the second data frame by using the backhaul link data.

Specifically, resource assignment information in the second data frame is acquired from the backhaul link data in the first data frame. According to the acquired resource assignment information, information encapsulation is performed, according to the transmission path, for data that needs to be forwarded by the next small cell in the backhaul link data, to obtain new backhaul link data (that is, backhaul link data in the second data frame), and the second data frame is assembled by using the new backhaul link data and the corresponding resource assignment information (only backhaul data resource assignment information related to a small cell that has not been passed yet is retained here); and/or according to the acquired resource assignment information, the small cell obtains new access link data by using data of a terminal served by a current small cell in the backhaul link data in the first data frame, and assembles the second data frame by using the new access link data and the corresponding resource assignment information (that is, access data resource assignment information related to the current small cell).

In FIG. 1, the small cell S-eNB1 receives the first data frame sent by the base station 100, and acquires the backhaul link data from the first data frame, where the data sent to the terminals UE3 and UE4 further needs to be forwarded by the next small cell S-eNB2, and the small cell S-eNB1 performs information encapsulation according to the transmission path to obtain new backhaul link data, and correspondingly obtains new backhaul data resource assignment information. The terminal UE2 is within a service range of the current small cell S-eNB1, the data sent to the terminal UE2 does not need to be forwarded by the next small cell S-eNB2. The small cell S-eNB1 uses the data sent to the terminal UE2 as new access link data, and correspondingly obtains new access data resource assignment information, to assemble a second data frame (a PHY data frame 2).

The second data frame is transmitted by using a user plane protocol stack, and the user plane protocol stack is formed by only a physical layer PHY layer, as shown in FIG. 4. In the base station M-eNB, a protocol stack includes L1, L2, an Internet Protocol IP layer, a User Data Protocol UDP layer, a GPRS Tunneling Protocol GTP layer, a PDCP layer, an RLC layer, a MAC layer, and a PHY layer. In the small cell, S-eNB1, S-eNB2, or the like, the user plane protocol stack is formed by only a PHY layer. Therefore, processing required by the forwarding node can be effectively simplified, a time required for multi-layer parsing processing and multi-layer forwarding processing is reduced, and a delay is reduced.

Optionally, the resource assignment information in the first data frame may further includes a type identifier information indicating a resource assignment manner of the control part and a type identifier information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame. The information indicating the resource assignment manners refers to assignment indication information of resources that carry the information in the control part and the information in the data part that are in the backhaul link data.

Figure 5:
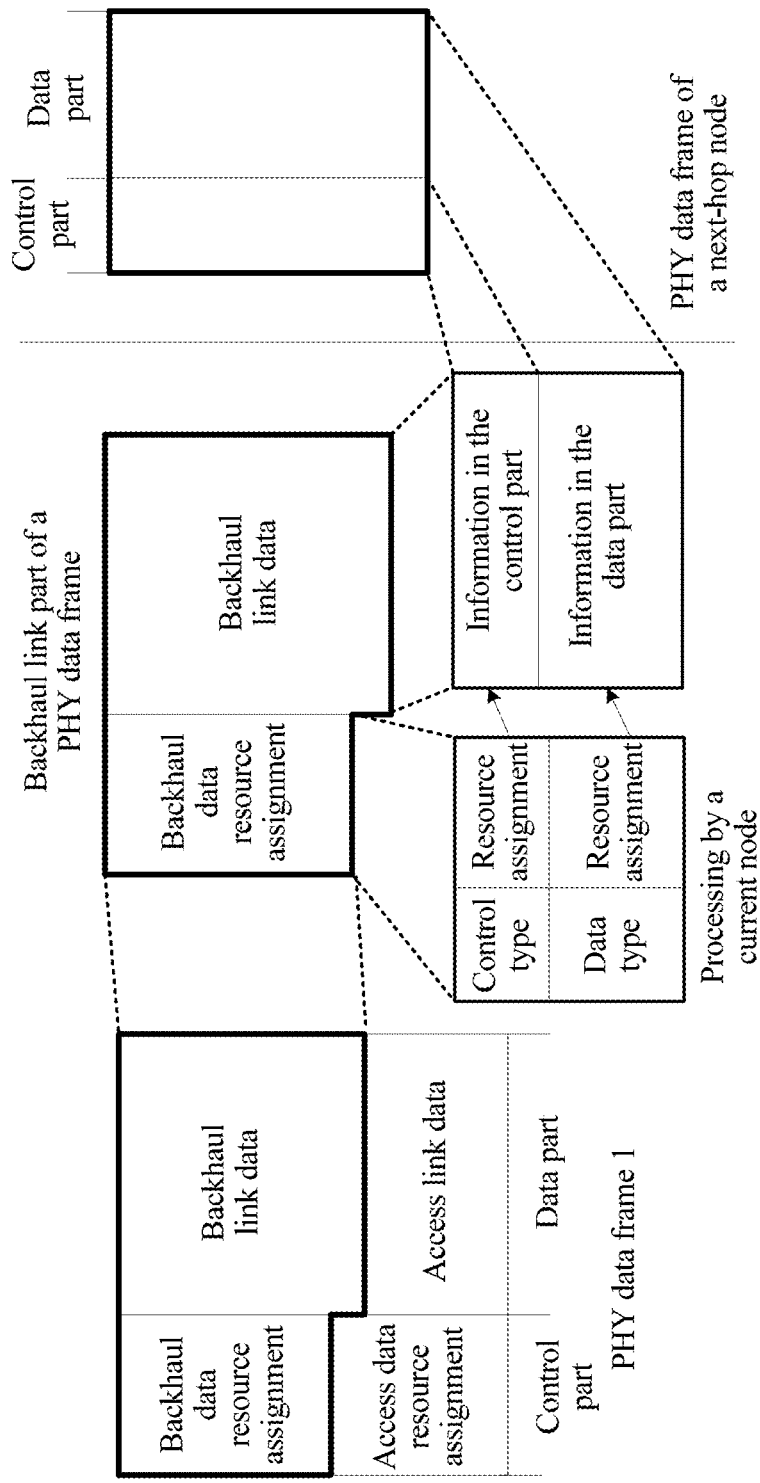
FIG. 5 is a schematic diagram of another data frame in a data transmission method according to an embodiment of the present invention.

Specifically, as shown in FIG. 5, during processing, according to the type identifiers and the information indicating the resource assignment manners, the small cell (that is, the current node) can acquire the information in the control part and the information in the data part from the backhaul data resource assignment information in the first data frame (the PHY data frame 1), and then in a specified manner, map the information in the control part to the control part of the second data frame, and map the information in the data part to the data part of the second data frame, to assemble the second data frame (that is, the PHY data frame of the small cell). For example, it is indicated that the information in the control part be transmitted by using the first several symbols in the data frame, and the information in the data part be transmitted by using the other part.

Further, the resource assignment information in the first data frame may further indicates a mapping method for the small cell that receives the first data frame to assemble the second data frame, so that the small cell performs mapping according to the mapping method to assemble the second data frame. For example, it is indicated how the small cell maps related data to the data frame of the small cell after receiving the related data, including a size and location occupied by a resource in the data frame, an MCS used, and the like.

Figure 6:
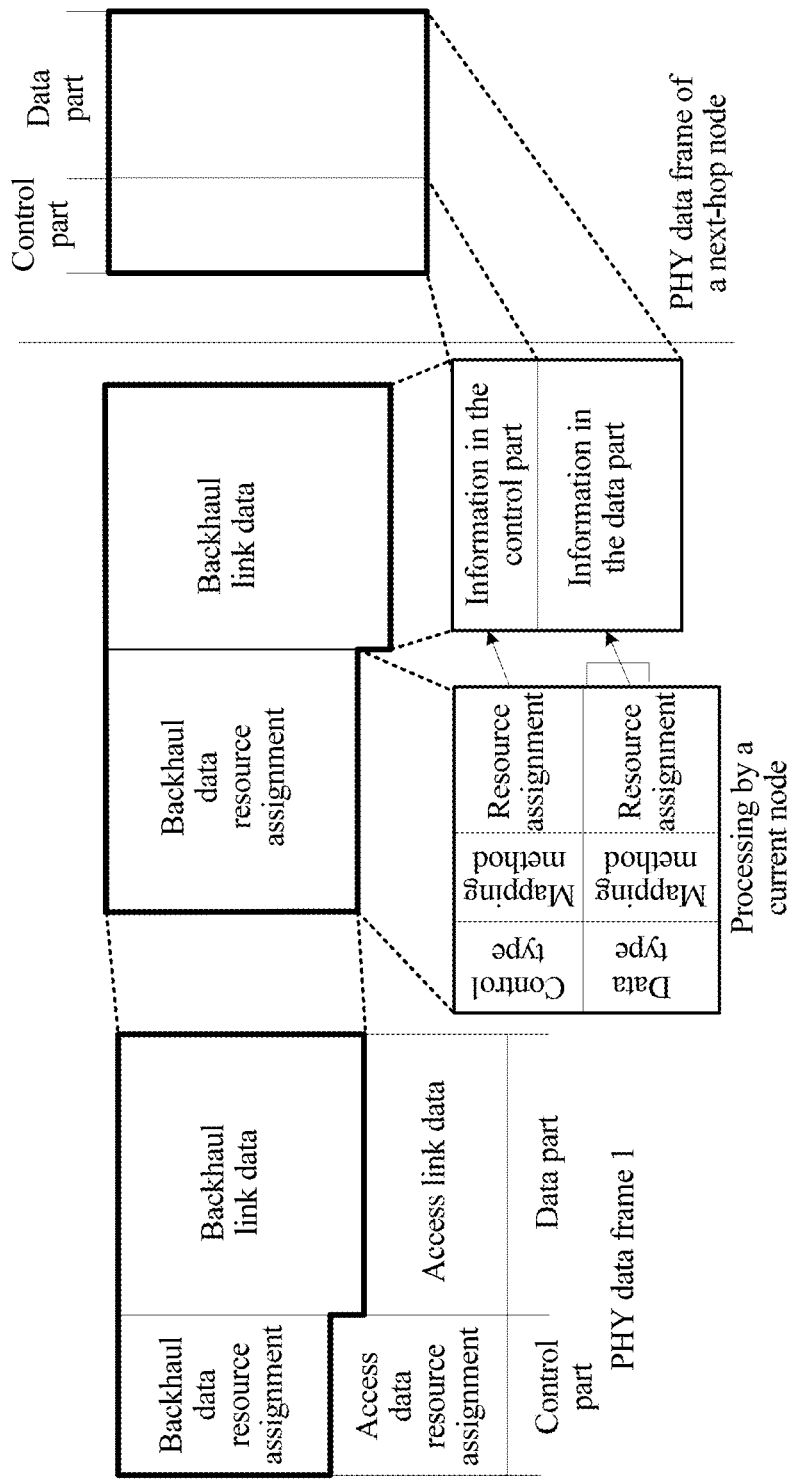
FIG. 6 is a schematic diagram of still another data frame in a data transmission method according to an embodiment of the present invention.

Specifically, as shown in FIG. 6, during processing, according to the type identifiers and the information indicating the resource assignment manners, the small cell (that is, the current node) can acquire the information in the control part and the information in the data part and a corresponding mapping method from the backhaul data resource assignment information in the first data frame (the PHY data frame 1), and then according to the specified manner and mapping method, map the information in the control part to the control part of the second data frame, and map the information in the data part to the data part of the second data frame, to assemble the second data frame (that is, the PHY data frame of the small cell).

Figure 7:
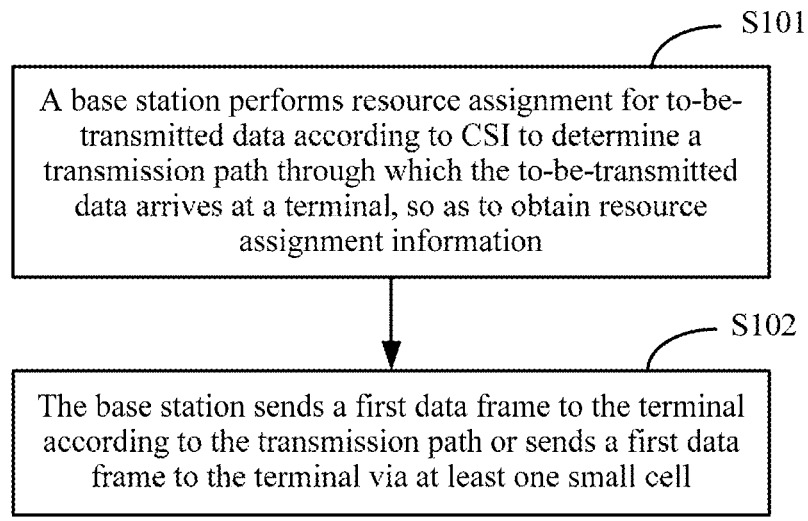
FIG. 7 is a flowchart of a data transmission method according to an embodiment of the present invention.

Accordingly, corresponding to FIG. 2, FIG. 7 is a flowchart of a data transmission method for a base station according to an embodiment of the present invention. As shown in FIG. 7, the data transmission method in this embodiment of the present invention includes:

S101. A base station performs resource scheduling and assignment for to-be-transmitted data according to CSI to determine a transmission path through which the to-be-transmitted data arrives at a terminal, so as to obtain resource assignment information.

The to-be-transmitted data may include data of multiple terminals, and may be classified into access link data and backhaul link data. The access link data refers to data that is directly transmitted between a base station or a small cell and a terminal without being further forwarded by another small cell. The backhaul link data refers to data that is transmitted between base stations, between a base station and a small cell, or between small cells.

Accordingly, the resource assignment information may include access data resource assignment information or backhaul data resource assignment information.

The terminal needs to feed back to the base station measured CSI that includes CSI of a high frequency band and/or CSI of a low frequency band. In addition, a small cell also needs to feed back CSI of the low frequency band and CSI of the high frequency band to the base station by using the low frequency band.

Therefore, before the base station performs resource assignment on the to-be-transmitted data according to the channel state information CSI, the method further includes: sending, by the base station, a CSI scheduling message to the terminal or the small cell within a service range of the base station, and receiving the CSI feedback by the terminal or the small cell. The CSI feedback by the small cell includes at least one of the following: CSI measured by the small cell, CSI sent by another small cell to the small cell and forwarded by the small cell to the base station, or CSI sent by another terminal to the small cell and forwarded by the small cell to the base station.

Optionally, the base station may further configure a specific frequency band at which the terminal or the small cell performs measurement and a feedback manner.

The CSI scheduling message includes the specific frequency band at which the terminal or the small cell measures the CSI and the feedback manner that are configured by the base station.

The CSI scheduling message specifically includes first indication information, where the first indication information is used to instruct the terminal to feed back the CSI to the small cell at a high frequency band and forward the CSI to the base station in a data form via the small cell, so that the terminal that receives the CSI scheduling message feeds back the CSI in a manner indicated by the first indication information.

In this way, the base station may instruct the terminal to feed back, by means of small cell forwarding, the CSI in a data form by using a high frequency band channel, so that control plane resources can be reduced.

Specifically, the CSI scheduling message may be carried in higher layer signaling or link resource assignment information. As shown in FIG. 1, a base station M-eNB may instruct, by using RRC signaling or PHY layer uplink resource assignment information, a terminal to feed back CSI information in a high frequency band, and an S-eNB forwards, to the M-eNB in a data form, the CSI information feedback by the terminal. Alternatively, an M-eNB may instruct, by using higher layer RRC signaling or PHY layer uplink resource assignment information, a terminal to feed back CSI information in a low frequency band, and the CSI information feedback by the terminal is directly sent to the M-eNB in a form of data or control information.

The base station performs resource scheduling and assignment for the to-be-transmitted data according to the CSI feedback by the terminal or the small cell. As shown in FIG. 1, in coverage of the base station M-eNB, transmission between a terminal UE and a small cell S-eNB is controlled by the base station M-eNB with centralized scheduling and assignment.

It can be learned from FIG. 1 that if the to-be-transmitted data includes data to be transmitted to four terminals (UE1 to UE4), the base station determines, according to related CSIs such as channel qualities, channel delays, and a quantity of channels, transmission paths through which the to-be-transmitted data arrives at the terminals. For example, the base station determines to directly transmit data of UE1 to UE1 by using a low frequency band channel, transmit data of UE2 to UE2 by means of forwarding by a small cell S-eNB1, transmit data of UE3 to UE3 by means of forwarding by small cells S-eNB1 and S-eNB2, and transmit data of UE4 to UE4 by means of forwarding by small cells S-eNB1, S-eNB2, and S-eNB3, so as to obtain resource assignment information.

The access link data refers to data that is directly transmitted between a base station or a small cell and a terminal without being further forwarded by another small cell. The backhaul link data refers to data that is transmitted between base stations, between a base station and a small cell, or between small cells.

It can be learned that the resource assignment information in the foregoing example includes access data resource assignment information and backhaul data resource assignment information. The access data resource assignment information includes assignment of resources transmit the data of UE1. The backhaul data resource assignment information includes assignment of resources transmitting the data of UE2, UE3, and UE4 by means of small cell forwarding.

S102. According to the transmission path, the base station sends a first data frame to the terminal, or sends a first data frame to the terminal via at least one small cell.

The first data frame includes the resource assignment information and the to-be-transmitted data. According to the transmission path determined in S101, the first data frame is sent to the terminal, or is sent to the terminal via the at least one small cell, so as to be sent to all data destination terminals.

S102 specifically includes:

S1021. The base station performs information encapsulation for first data according to the transmission path, to obtain backhaul link data or access link data.

S1022. The base station assembles the first data frame by using the resource assignment information and the backhaul link data or the access link data.

The base station assembles the first data frame by using the resource assignment information and the to-be-transmitted data.

The to-be-transmitted data in the first data frame includes at least one of the following: the access link data or the backhaul link data.

For the base station, the access link data is data of the terminal served by the base station in the to-be-transmitted data, and the backhaul link data is data that needs to be forwarded for one or more times by one or more small cells to the terminal in the to-be-transmitted data. Because the to-be-transmitted data may need to be forwarded by multiple small cells, in this embodiment of the present invention, forwarding by one small cell is one time of forwarding, and forwarding by multiple small cells is multiple times of forwarding.

The base station assembles the first data frame by using the access link data or the backhaul link data and the corresponding resource assignment information. The first data frame includes a control part and a data part, the resource assignment information is the control part, and the access link data or the backhaul link data (that is, the to-be-transmitted data) is the data part.

In an example in which the backhaul link data includes the data transmitted to UE2, UE3, and UE4 in FIG. 1, the data transmitted to UE2, UE3, and UE4 needs to be forwarded by one or more small cells (S-eNB1, S-eNB2, and S-eNB3), and the base station performs information encapsulation for this part of data according to the transmission path, to obtain the backhaul link data in the first data frame, and uses the corresponding related resource assignment information as the backhaul data resource assignment information, to obtain the first data frame. UE1 is a terminal served by the base station, and therefore, the data transmitted to UE1 is directly sent to UE1 by the base station without being forwarded by a small cell. The base station uses this part of data as the access link data in the first data frame, and uses the corresponding related resource assignment information as the access data resource assignment information, to obtain the first data frame. If the to-be-transmitted data of the base station includes both the access link data and the backhaul link data, after the access link data and the backhaul link data are obtained, respectively, the first data frame is assembled by using the access link data and the backhaul link data. In this way, the first data frame includes the backhaul data resource assignment information, the backhaul link data, the access data resource assignment information, and the access link data.

A specific data frame structure is shown in FIG. 4, the first data frame (a PHY data frame 1) assembled by the base station includes the backhaul data resource assignment information, the backhaul link data, the access data resource assignment information, and the access link data.

The first data frame is transmitted by using a user plane protocol stack, and the user plane protocol stack is formed by only a physical layer PHY layer. Because the protocol stack is formed by only the PHY layer, a forwarding node needs to perform parsing processing and forwarding processing at only the PHY layer during forwarding, and does not need to perform parsing processing at a PDCP layer, an RLC layer, a MAC layer, or the like. Therefore, processing required by the forwarding node can be effectively simplified, a time required for parsing processing and forwarding processing is reduced, and a delay is reduced.

S1023. The base station sends the first data frame to a terminal served by the base station, or the base station sends the first data frame to a small cell in the transmission path, where the small cell is a next hop of the base station, to enable the small cell to assemble a second data frame and sends the second data frame to the terminal, or sends the second data frame to a next next-hop small cell, where the next next-hop small cell forwards the second data frame to the terminal.

After receiving the first data frame, the terminal served by the base station and the small cell perform different processing. The first data frame sent to the small cell further needs to be forwarded after being processed by the small cell, and is forwarded for one or more times until all the to-be-transmitted data is sent to the corresponding destination terminals, which specifically includes:

when receiving the first data frame, the terminal served by the base station acquires the access link data from the first data frame. As shown in FIG. 1, the terminal UE1 receives the first data frame sent by the base station 100, and acquires the access link data from the first data frame, that is, the data sent to the terminal UE1.

When receiving the first data frame, the small cell acquires the backhaul link data from the first data frame, and then forwards the backhaul link data to a terminal served by the small cell or a next small cell. The small cell that receives the first data frame acquires the backhaul link data from the first data frame, and assembles the second data frame by using the backhaul link data.

Specifically, resource assignment information in the second data frame is acquired from the backhaul link data in the first data frame. According to the acquired resource assignment information, information encapsulation is performed, according to the transmission path, for data that needs to be forwarded by the next small cell in the backhaul link data, to obtain new backhaul link data (that is, backhaul link data in the second data frame), and the second data frame is assembled by using the new backhaul link data and the corresponding resource assignment information (only backhaul data resource assignment information related to a small cell that has not been passed yet is retained here); and/or according to the acquired resource assignment information, the small cell obtains new access link data by using data of a terminal served by a current small cell in the backhaul link data in the first data frame, and assembles the second data frame by using the new access link data and the corresponding resource assignment information (that is, access data resource assignment information related to the current small cell).

In FIG. 1, the small cell S-eNB1 receives the first data frame sent by the base station 100, and acquires the backhaul link data from the first data frame, where the data sent to the terminals UE3 and UE4 further needs to be forwarded by the next small cell S-eNB2, and the small cell S-eNB1 performs information encapsulation according to the transmission path to obtain new backhaul link data, and correspondingly obtains new backhaul data resource assignment information. The terminal UE2 is within a service range of the current small cell S-eNB1, the data sent to the terminal UE2 does not need to be forwarded by the next small cell S-eNB2. The small cell S-eNB1 uses the data sent to the terminal UE2 as new access link data, and correspondingly obtains new access data resource assignment information, to assemble a second data frame (a PHY data frame 2).

The second data frame is transmitted by using a user plane protocol stack, and the user plane protocol stack is formed by only a physical layer PHY layer, as shown in FIG. 4. Therefore, processing required by the forwarding node can be effectively simplified, a time required for multi-layer parsing processing and multi-layer forwarding processing is reduced, and a delay is reduced.

Optionally, the resource assignment information in the first data frame may further includes a type identifier information indicating a resource assignment manner of the control part and a type identifier information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame. The information indicating the resource assignment manners refer to assignment indication information of resources that carry the information in the control part and the information in the data part that are in the backhaul link data.

Specifically, as shown in FIG. 5, during processing, according to the type identifiers and the information indicating the resource assignment manners, the small cell (that is, the current node) can acquire the information in the control part and the information in the data part from the backhaul data resource assignment information in the first data frame (the PHY data frame 1), and then in a specified manner, map the information in the control part to the control part of the second data frame, and map the information in the data part to the data part of the second data frame, to assemble the second data frame (that is, the PHY data frame of the small cell). For example, it is indicated that the information in the control part be transmitted by using the first several symbols in the data frame, and the information in the data part be transmitted by using the other part.

Further, the resource assignment information in the first data frame may further indicates a mapping method for the small cell that receives the first data frame to assemble the second data frame, so that the small cell performs mapping according to the mapping method to assemble the second data frame. For example, it is indicated how the small cell maps related data to the data frame of the small cell after receiving the related data, including a size and a location occupied by a resource in the data frame, an MCS used, and the like.

Specifically, as shown in FIG. 6, during processing, according to the type identifiers and the information indicating the resource assignment manners, the small cell (that is, the current node) can acquire the information in the control part and the information in the data part and a corresponding mapping method from the backhaul data resource assignment information in the first data frame (the PHY data frame 1), and then according to the specified mapping method, map the information in the control part to the control part of the second data frame, and map the information in the data part to the data part of the second data frame, to assemble the second data frame (that is, the PHY data frame of the small cell).

Figure 8:
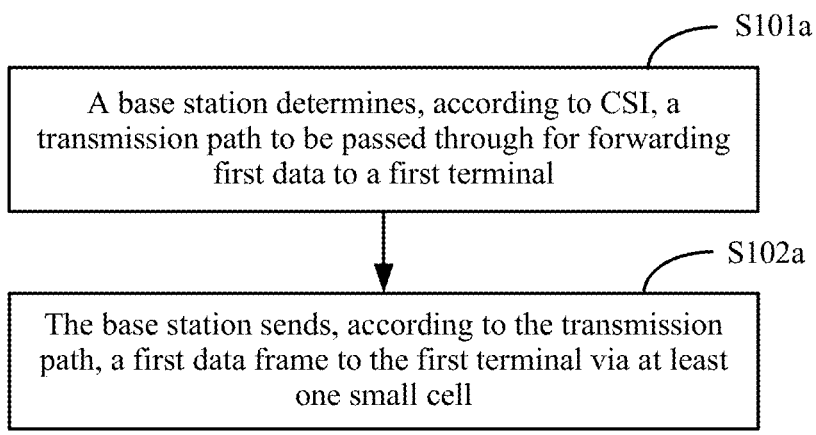
FIG. 8 is a flowchart of another data transmission method according to an embodiment of the present invention.

Specifically, if the to-be-transmitted data is first data to be sent to a first terminal, a specific processing flowchart is shown in FIG. 8, including:

S101a. A base station determines, according to CSI, a transmission path for forwarding the first data to the first terminal, where if the base station determines that the first data needs to be forwarded by at least one small cell to the first terminal, the transmission path includes a path from the base station to a small cell and a path from the small cell to the first terminal.

S102a. The base station sends, according to the transmission path, a first data frame to the first terminal via the at least one small cell.

The first data frame includes resource assignment information and the first data, and the resource assignment information includes resource assignment information from the base station to the small cell and resource assignment information from the small cell to the first terminal.

S102a specifically includes:

S102a1. The base station performs information encapsulation for the first data according to the transmission path, to obtain backhaul link data.

The backhaul link data is data that needs to be forwarded by at least one small cell.

S102a2. The base station assembles the first data frame by using the resource assignment information and the backhaul link data.

S102a3. The base station sends the first data frame to a small cell in the transmission path, where the small cell is a next hop of the base station, to enable the small cell to assemble a second data frame and sends the second data frame to the first terminal, or sends the second data frame to a next next-hop small cell, where the next next-hop small cell forwards the second data frame to the first terminal.

If the base station determines the first data is to be forwarded by one small cell to the first terminal, the backhaul link data in the first data frame includes access link data in the second data frame, and the first data is the access link data in the second data frame.

If the base station determines that the first data needs to be forwarded by at least two small cells to the first terminal, the backhaul link data in the first data frame includes backhaul link data in the second data frame, and the first data is the backhaul link data in the second data frame.

Figure 9:
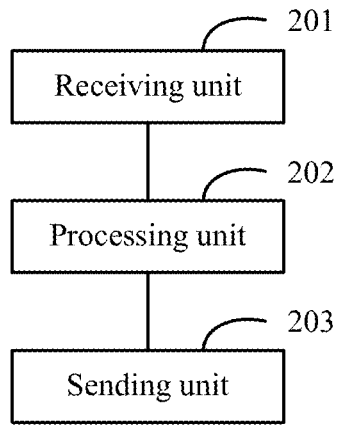
FIG. 9 is a schematic structural diagram of a small cell according to an embodiment of the present invention.

FIG. 9 is a schematic diagram of a small cell according to an embodiment of the present invention. As shown in FIG. 9, the small cell in this embodiment of the present invention includes: a receiving unit 201, a processing unit 202, and a sending unit 203.

The receiving unit 201 is configured to receive a first data frame sent by a previous-hop node, where the first data frame includes resource assignment information and data.

The data includes at least backhaul link data, and the resource assignment information includes at least backhaul data resource assignment information. The previous-hop node may be a base station or a small cell.

If the backhaul link data includes first data to be sent to a first terminal, the backhaul data resource assignment information includes resource assignment information from the current node to the first terminal.

Optionally, the first data frame received by the receiving unit 201 further includes access link data, where if the access link data is sent to a terminal served by the previous-hop node, the resource assignment information further includes access data resource assignment information.

The processing unit 202 is configured to assemble a second data frame by using the backhaul link data in the first data frame received by the receiving unit 201.

The second data frame includes resource assignment information and data.

The data in the second data frame includes at least one of the following: access link data or backhaul link data.

Correspondingly, the resource assignment information in the second data frame includes at least one of the following: access data resource assignment information or backhaul data resource assignment information.

The access link data in the second data frame is data of a terminal served by the small cell in the backhaul link data in the first data frame. The backhaul link data in the second data frame is data that needs to be forwarded by a next-hop node in the backhaul link data in the first data frame.

For the first data of the first terminal, if the first terminal is a terminal served by the small cell, the first data is the access link data in the second data frame. If the first terminal is a terminal served by another small cell, the first data is the backhaul link data in the second data frame.

Specifically, as shown in FIG. 4, for a small cell S-eNB1, the receiving unit 201 receives a first data frame (a PHY data frame 1) sent by a base station M-eNB, and the processing unit 202 assembles a second data frame (a PHY data frame 2) by using backhaul link data in the first data frame. Specifically, the processing unit 202 acquires resource assignment information in the second data frame from the backhaul link data in the first data frame, performs, according to the acquired resource assignment information and according to a transmission path, information encapsulation for data that needs to be forwarded by a next small cell in the backhaul link data, to obtain new backhaul link data, and correspondingly obtains new backhaul data resource assignment information. The processing unit 202 obtains new access link data by using data of a terminal served by the small cell (the current node) in the backhaul link data, and correspondingly obtains new access data resource assignment information, so as to assemble the second data frame (the PHY data frame 2).

The second data frame is transmitted by using a user plane protocol stack, and the user plane protocol stack is formed by only a physical layer PHY layer, as shown in FIG. 4. Therefore, processing required by a forwarding node can be effectively simplified, a time required for parsing processing and forwarding processing is reduced, and a delay is reduced.

The sending unit 203 is configured to send the second data frame assembled by the processing unit 202 to the next-hop node or the terminal served by the small cell (the current node).

The next-hop node may be a small cell.

The first data frame or the second data frame includes a control part and a data part, the resource assignment information is the control part, and the backhaul link data or the access link data is the data part.

Optionally, as shown in FIG. 5, the resource assignment information in the first data frame further includes a type identifier and information indicating a resource assignment manner of the control part and a type identifier and information indicating a resource assignment manner of the data part.

The processing unit 202 is specifically configured to: according to the type identifiers and the information indicating the resource assignment manners that are in the resource assignment information, map information in the control part in the backhaul link data in the first data frame to the control part of the second data frame, and map information in the data part in the backhaul link data in the first data frame to the data part of the second data frame.

Specifically, as shown in FIG. 5, during processing, according to the type identifiers and the information indicating the resource assignment manners, the processing unit 202 of the small cell (that is, the current node) can acquire the information in the control part and the information in the data part from the backhaul data resource assignment information in the first data frame (the PHY data frame 1), and then in a specified manner, map the information in the control part to the control part of the second data frame, and map the information in the data part to the data part of the second data frame, to assemble the PHY data frame of the small cell (that is, the current node). For example, it is indicated that the information in the control part be transmitted by using the first several symbols in the data frame or resources in a middle part of the data frame, and the information in the data part be transmitted by using the other part.

Further, the resource assignment information in the first data frame further indicates a mapping method for the current node to assemble the second data frame, so that the current node performs mapping according to the mapping method to assemble the second data frame.

Specifically, as shown in FIG. 6, during processing, according to the type identifiers and the information indicating the resource assignment manners, the processing unit 202 of the small cell (that is, the current node) can acquire the information in the control part and the information in the data part and a corresponding mapping method from the backhaul data resource assignment information in the first data frame (the PHY data frame 1), and then according to the specified manner and mapping method, map the information in the control part to the control part of the second data frame, and map the information in the data part to the data part of the second data frame, to assemble the second data frame (that is, the PHY data frame of the small cell). For example, it is indicated how the small cell maps related data to the data frame of the small cell after receiving the related data, including a size and location occupied by a resource in the data frame, an MCS used, and the like.

The terminal 300 needs to feed back to the base station 100 measured CSI that includes CSI of a high frequency band and/or CSI of a low frequency band. In addition, the small cell 200 also needs to feed back CSI of the low frequency band and CSI of the high frequency band to the base station 100 by using the low frequency band. Therefore, the receiving unit 201 may be further configured to receive a CSI scheduling message sent by the base station or CSI sent by another node or another terminal.

If the receiving unit 201 receives the CSI scheduling message sent by the base station, the processing unit 202 feeds back, according to the CSI scheduling message received by the receiving unit 201, the CSI obtained by means of measurement to the base station by using the sending unit 203.

If the receiving unit 201 receives the CSI sent by the another node or the another terminal, the processing unit 202 forwards the CSI received by the receiving unit 201 to the base station.

The CSI received by the receiving unit 201 includes CSI sent by the another node (a small cell) to the current node or CSI sent by the another terminal to the current node. Therefore, the CSI feedback by the current node to the base station by using the sending unit 203 includes at least one of the following: the CSI measured by the current node; the CSI sent by the another small cell to the current node and forwarded by the current node to the base station; or the CSI sent by the another terminal to the current node and forwarded by the current node to the base station.

Figure 10:
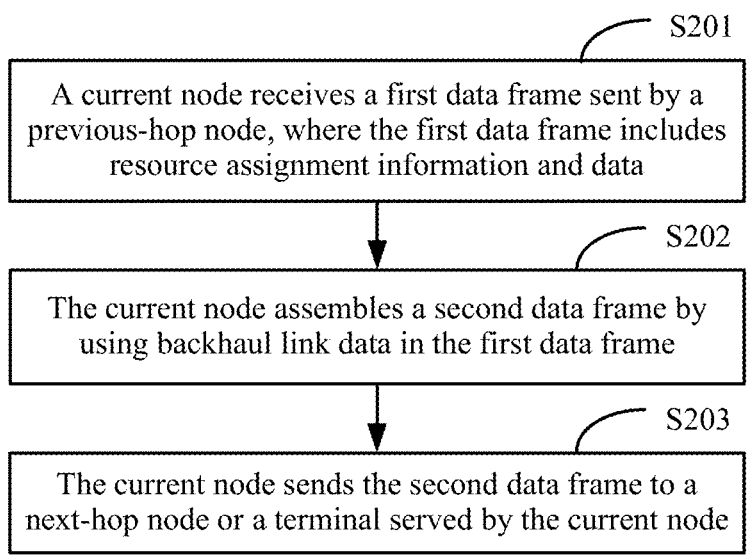
FIG. 10 is a flowchart of still another data transmission method according to an embodiment of the present invention.

Accordingly, corresponding to FIG. 9, FIG. 10 is a flowchart of a data transmission method for a small cell according to an embodiment of the present invention. As shown in FIG. 10, the method includes:

S201. A current node receives a first data frame sent by a previous-hop node, where the first data frame includes resource assignment information and data.

The data includes at least backhaul link data, and the resource assignment information includes at least backhaul data resource assignment information. The previous-hop node may be a base station or a small cell.

If the backhaul link data includes first data to be sent to a first terminal, the backhaul data resource assignment information includes resource assignment information from the current node to the first terminal.

S202. The current node assembles a second data frame by using backhaul link data in the first data frame.

The second data frame includes resource assignment information and data.

The data in the second data frame includes at least one of the following: access link data or backhaul link data.

Correspondingly, the resource assignment information in the second data frame includes at least one of the following: access data resource assignment information or backhaul data resource assignment information.

The access link data in the second data frame is data of a terminal served by the current node in the backhaul link data in the first data frame. The backhaul link data in the second data frame is data that needs to be forwarded by a next-hop node in the backhaul link data in the first data frame.

For the first data of the first terminal, if the first terminal is a terminal served by the small cell, the first data is the access link data in the second data frame. If the first terminal is a terminal served by another small cell, the first data is the backhaul link data in the second data frame.

Specifically, as shown in FIG. 4, a small cell S-eNB1 receives a first data frame (a PHY data frame 1) sent by a base station M-eNB, and the small cell S-eNB1 assembles a second data frame (a PHY data frame 2) by using backhaul link data in the first data frame.

Specifically, the current node acquires resource assignment information in the second data frame from the backhaul link data in the first data frame; performs, according to the acquired resource assignment information and according to a transmission path, information encapsulation for data that needs to be forwarded by a next small cell in the backhaul link data, to obtain new backhaul link data, and correspondingly obtains new backhaul data resource assignment information; and obtains new access link data by using data of a terminal served by the current node (the small cell S-eNB1) in the backhaul link data, and correspondingly obtains new access data resource assignment information, so as to assemble the second data frame (the PHY data frame 2).

The second data frame is transmitted by using a user plane protocol stack, and the user plane protocol stack is formed by only a physical layer PHY layer, as shown in FIG. 4. Therefore, processing required by a forwarding node can be effectively simplified, a time required for parsing processing and forwarding processing is reduced, and a delay is reduced.

The first data frame or the second data frame includes a control part and a data part, the resource assignment information is the control part, and the backhaul link data or the access link data is the data part.

Optionally, as shown in FIG. 5, the resource assignment information in the first data frame further includes a type identifier and information indicating a resource assignment manner of the control part and a type identifier and information indicating a resource assignment manner of the data part.

That the current node assembles the second data frame according to the resource assignment information and according to the backhaul link data in the first data frame specifically includes:

according to the type identifiers and the information indicating the resource assignment manners that are in the resource assignment information, the current node maps information in the control part in the backhaul link data in the first data frame to the control part of the second data frame, and maps information in the data part in the backhaul link data in the first data frame to the data part of the second data frame.

Specifically, as shown in FIG. 5, during processing, according to the type identifiers and the information indicating the resource assignment manners, the small cell (that is, the current node) can acquire the information in the control part and the information in the data part from the backhaul data resource assignment information in the first data frame (the PHY data frame 1), and then in a specified manner, map the information in the control part to the control part of the second data frame, and map the information in the data part to the data part of the second data frame, to assemble the second data frame (that is, the PHY data frame of the small cell). For example, it is indicated that the information in the control part be transmitted by using the first several symbols in the data frame or resources in a middle part of the data frame, and the information in the data part be transmitted by using the other part.

Further, the resource assignment information in the first data frame further indicates a mapping method for the current node to assemble the second data frame, so that the current node performs mapping according to the mapping method to assemble the second data frame.

Specifically, as shown in FIG. 6, during processing, according to the type identifiers and the information indicating the resource assignment manners, the small cell (that is, the current node) can acquire the information in the control part and the information in the data part and a corresponding mapping method from the backhaul data resource assignment information in the first data frame (the PHY data frame 1), and then according to the specified mapping method, map the information in the control part to the control part of the second data frame, and map the information in the data part to the data part of the second data frame, to assemble the second data frame (that is, the PHY data frame of the small cell). For example, it is indicated how the small cell maps related data to the data frame of the small cell after receiving the related data, including a size and location occupied by a resource in the data frame, an MCS used, and the like.

S203. The current node sends the second data frame to a next-hop node or a terminal served by the current node.

The next-hop node may be a small cell.

The terminal needs to feed back to the base station measured CSI that includes CSI of a high frequency band and/or CSI of a low frequency band. In addition, a small cell also needs to feed back CSI of the low frequency band and CSI of the high frequency band to the base station by using the low frequency band. Therefore, before the current node receives the first data frame sent by the previous-hop node, the method further includes:

receiving, by the current node, a CSI scheduling message sent by the base station, and feeding back, according to the CSI scheduling message, the CSI obtained by means of measurement to the base station, or forwarding CSI received by the current node to the base station.

Figure 11:
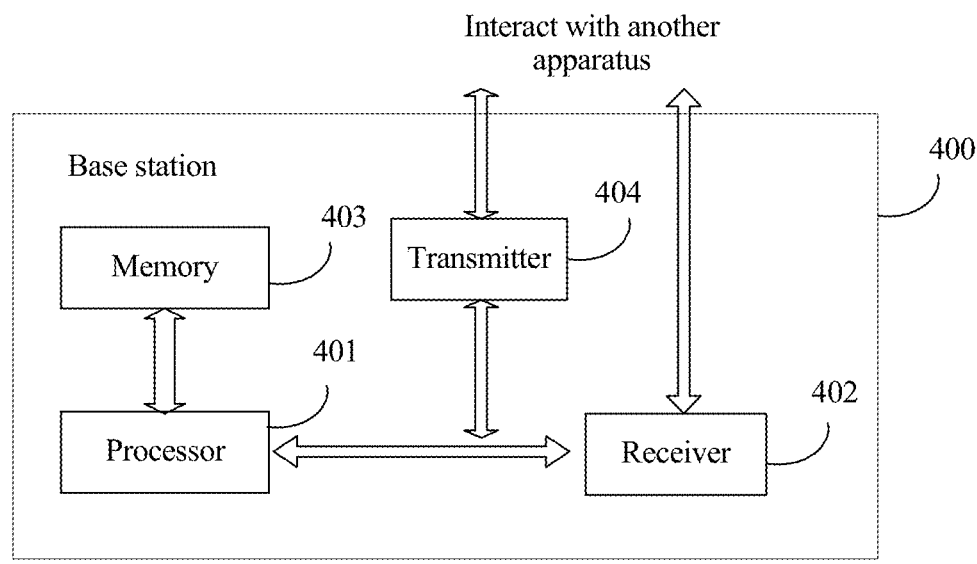
FIG. 11 is a schematic structural diagram of composition of a base station according to an embodiment of the present invention.

FIG. 11 is a schematic structural diagram of composition of a base station according to an embodiment of the present invention. As shown in FIG. 11, the base station includes: a processor 401, a receiver 402, a memory 403, and a transmitter 404.

The receiver 402 is configured to receive data sent by another apparatus, where the another apparatus may include a terminal, another base station, or a small cell.

The transmitter 404 is configured to send data to the another apparatus.

The memory 403 may be a permanent memory, for example, a hard disk drive or a flash memory, and the memory 403 has a software module and a device driver. The software module is various functional modules capable of executing the foregoing method in the embodiment of the present invention, and the device driver may be a network or interface driver.

Upon startup, these software components are loaded into the memory 403 and then are accessed by the processor 401 to execute the following instructions:

determining, according to channel state information CSI, a transmission path for forwarding first data to a first terminal, where if the base station determines that the first data needs to be forwarded by at least one small cell to the first terminal, the transmission path includes a path from the base station to a small cell and a path from the small cell to the first terminal; and sending, according to the transmission path by using the transmitter, a first data frame to the first terminal via the at least one small cell, where the first data frame includes resource assignment information and the first data, and the resource assignment information includes resource assignment information from the base station to the small cell and resource assignment information from the small cell to the first terminal.

That the processor 401 is configured to send, according to the transmission path by using the transmitter, the first data frame to the first terminal via the at least one small cell specifically includes:

the processor 401 is configured to: perform information encapsulation for the first data according to the transmission path, to obtain backhaul link data, where the backhaul link data is data that needs to be forwarded by at least one small cell;

assemble the first data frame by using the resource assignment information and the backhaul link data; and send the first data frame to a small cell in the transmission path, where the small cell is a next hop of the base station by using the transmitter, to enable the small cell to assemble a second data frame and sends the second data frame to the first terminal, or sends the second data frame to a next next-hop small cell, where the next next-hop small cell forwards the second data frame to the first terminal.

If the processor 401 determines the first data is to be forwarded by one small cell to the first terminal, the backhaul link data in the first data frame includes access link data in the second data frame, and the first data is the access link data in the second data frame.

If the processor 401 determines that the first data needs to be forwarded by at least two small cells to the first terminal, the backhaul link data in the first data frame includes backhaul link data in the second data frame, and the first data is the backhaul link data in the second data frame.

The first data frame includes a control part and a data part, the resource assignment information is the control part, and the first data is the data part; and the resource assignment information in the first data frame further includes a type identifier information indicating a resource assignment manner of the control part and a type identifier information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame.

The resource assignment information in the first data frame further indicates a mapping method for the small cell that receives the first data frame to assemble the second data frame, so that the small cell performs mapping according to the mapping method to assemble the second data frame.

Before the base station determines, according to the channel state information CSI, the transmission path for forwarding the first data to the first terminal, the processor 401 is further configured to: send a CSI scheduling message to a terminal or a small cell within a service range of the base station by using the transmitter 404, and receive, by using the receiver 402, the CSI feedback by the terminal or the small cell. The CSI scheduling message includes a specific frequency band at which the terminal or the small cell measures the CSI and a feedback manner that are configured by the base station, and the CSI feedback by the small cell includes CSI measured by the small cell, CSI sent by another small cell to the small cell and forwarded by the small cell to the base station, or CSI sent by another terminal to the small cell and forwarded by the small cell to the base station.

The CSI scheduling message specifically includes first indication information, where the first indication information is used to instruct the terminal to feed back the CSI to the small cell at a specified frequency band and forward the CSI to the base station in a data form via the small cell, so that the terminal that receives the CSI scheduling message feeds back the CSI in a manner indicated by the first indication information.

The first data frame is transmitted by using a user plane protocol stack, and the user plane protocol stack is formed by only a physical layer PHY layer.

Specifically, the apparatus further executes the method in the foregoing FIG. 7 or FIG. 8 according to the instructions, and details are not specifically described herein again.

Figure 12:
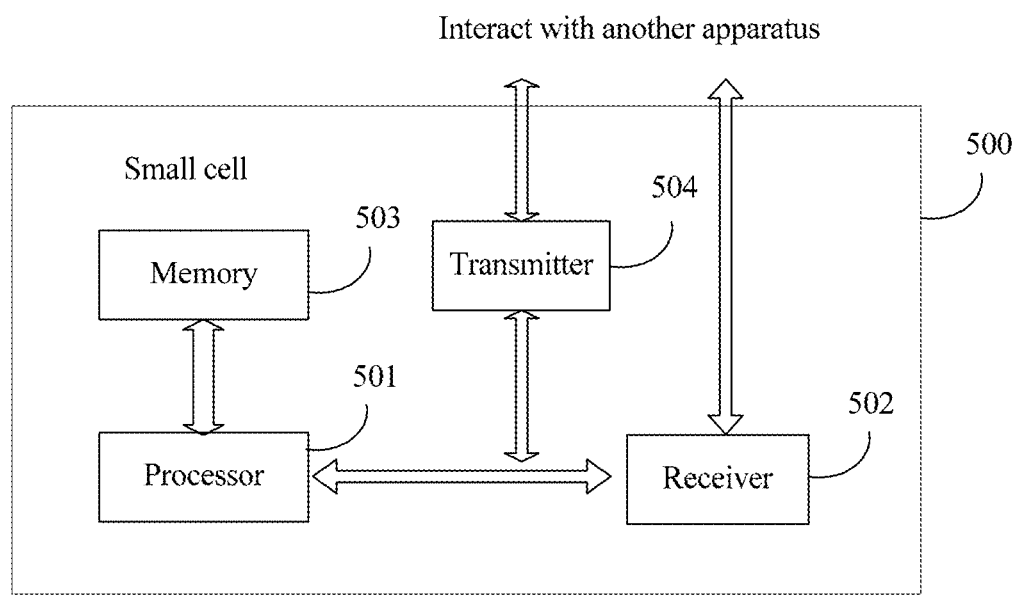
FIG. 12 is a schematic structural diagram of composition of a small cell according to an embodiment of the present invention.

FIG. 12 is a schematic structural diagram of composition of a small cell according to an embodiment of the present invention. As shown in FIG. 12, the small cell includes: a processor 501, a receiver 502, a memory 503, and a transmitter 504.

The receiver 502 is configured to receive data sent by a previous-hop node or a next-hop node.

The transmitter 504 is configured to send data to the previous-hop node or the next-hop node.

The memory 503 may be a permanent memory, for example, a hard disk drive or a flash memory, and the memory 503 has a software module and a device driver. The software module is various functional modules capable of executing the foregoing method in the embodiment of the present invention, and the device driver may be a network or interface driver.

Upon startup, these software components are loaded into the memory 503 and then are accessed by the processor 501 to execute the following instructions:

receiving, by using the receiver 502, a first data frame sent by the previous-hop node, where the first data frame includes resource assignment information and data, the data includes at least backhaul link data, the backhaul link data includes first data to be sent to a first terminal, the resource assignment information includes at least backhaul data resource assignment information, and the backhaul data resource assignment information includes resource assignment information from the current node to the first terminal;

assembling the second data frame by using the backhaul link data in the first data frame, where the second data frame includes resource assignment information and data, the data in the second data frame includes at least one of the following: access link data or backhaul link data, the resource assignment information in the second data frame includes at least one of the following: access data resource assignment information or backhaul data resource assignment information, the access link data in the second data frame is data of a terminal served by the small cell in the backhaul link data in the first data frame, and the backhaul link data in the second data frame is data that needs to be forwarded by the next-hop node in the backhaul link data in the first data frame, where if the first terminal is a terminal served by the small cell, the first data is the access link data in the second data frame; or if the first terminal is a terminal served by another small cell, the first data is the backhaul link data in the second data frame; and sending, by using the transmitter 504, the second data frame to the next-hop node or the terminal served by the small cell.

The first data frame or the second data frame includes a control part and a data part, the resource assignment information is the control part, and the backhaul link data or the access link data is the data part. The resource assignment information in the first data frame further includes a type identifier information indicating a resource assignment manner of the control part and a type identifier information indicating a resource assignment manner of the data part.

The processor 501 is configured to: according to the type identifiers and the information indicating the resource assignment manners, map information in the control part in the backhaul link data in the first data frame to the control part of the second data frame, and map information in the data part in the backhaul link data in the first data frame to the data part of the second data frame, to assemble the second data frame.

The resource assignment information in the first data frame further indicates a mapping method for the current node to assemble the second data frame. The processor 501 is specifically configured to perform mapping according to the mapping method to assemble the second data frame.

The first data frame or the second data frame is transmitted by using a user plane protocol stack, and the user plane protocol stack is formed by only a physical layer PHY layer.

Before receiving, by using the receiver 502, the first data frame sent by the previous-hop node, the processor 501 is further configured to: receive, by using the receiver 502, a CSI scheduling message sent by the base station, and feed back, according to the CSI scheduling message by using the transmitter 504, CSI obtained by means of measurement to the base station, or forward, by using the transmitter, CSI received by the current node by using the receiver to the base station. The CSI received by the current node by using the receiver includes CSI sent by the another small cell to the current node or CSI sent by the another terminal to the current node.

Specifically, the apparatus further executes the method in the foregoing FIG. 10 according to the instructions, and details are not specifically described herein again.

According to the data transmission method and the base station provided in the embodiments of the present invention, the base station schedules, in a centralized manner, according to CSI information, all radio resources used in an entire network, and encapsulates, by means of information encapsulation, backhaul data transmitted via a small cell into a data part on a previous-hop node for transmission, which can effectively support multi-hop transmission in a millimeter-wave communications system; and a user plane protocol stack of the small cell is formed by only a PHY layer, and therefore, processing by a forwarding node is simplified, a delay is reduced, and expansibility is good. In the present invention, a solution in which a user plane is separated from a control plane is combined with a millimeter-wave networking technology, which effectively improves a system capacity of a mobile communications system and network deploying flexibility, and may further effectively support multi-hop transmission in a millimeter-wave network.

In the prior art, because a Un-U interface is used between a base station and a relay node to transmit user plane data, and a Uu-U interface is used between the base station and a terminal UE to transmit user plane data, during frame assembling, the base station can only separately assemble a data frame sent to the relay node and a data frame sent to the terminal, and can only separately send the data frame to the relay node or the terminal in a fixed manner, and after receiving the data frame, the relay node can forward the data frame to only the terminal but not another relay node; consequently, multi-hop relay transmission cannot be implemented.

Figure 13:
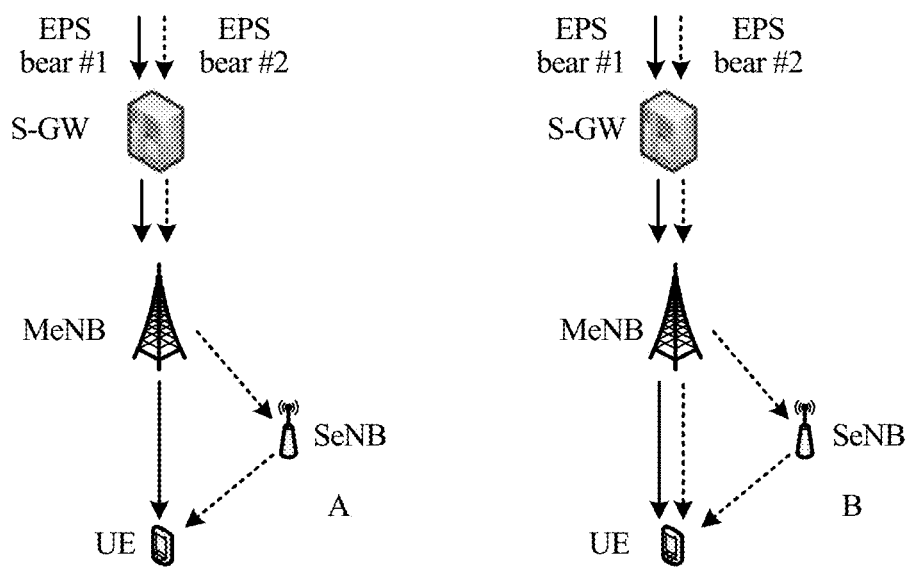
FIG. 13 is a schematic diagram of an existing biconnected user plane architecture.

For example, FIG. 13 is a schematic diagram of an existing biconnected user plane architecture. In the architecture, a user plane interface between a serving gateway S-GW and a macro base station MeNB is an S1-U interface, and the S1-U interface terminates on the macro base station MeNB. A data bearer 1 (EPS bearer #1) is transmitted to user equipment UE by using a radio air interface of the macro base station MeNB, and a data bearer 2 (EPS bearer #2) may be forwarded to a small cell SeNB by using the macro base station MeNB and then is transmitted to the user equipment UE, as shown in A in the figure. Alternatively, a data bearer 2 may be segmented on the macro base station MeNB, where one portion is transmitted to user equipment UE by using a radio air interface of the macro base station MeNB, and the other portion is transmitted to a small cell SeNB and transmitted to the user equipment UE by using a radio air interface of the small cell SeNB, as shown in B in the figure.

For this biconnected user plane architecture, a user plane protocol stack used in the biconnected user plane architecture is mainly for a two-hop relay communications system, that is, data is sent from a macro base station to a small cell, and then is sent from the small cell to a terminal. This is not applicable to a case in which multi-hop relay between small cells is required.

Figure 14:
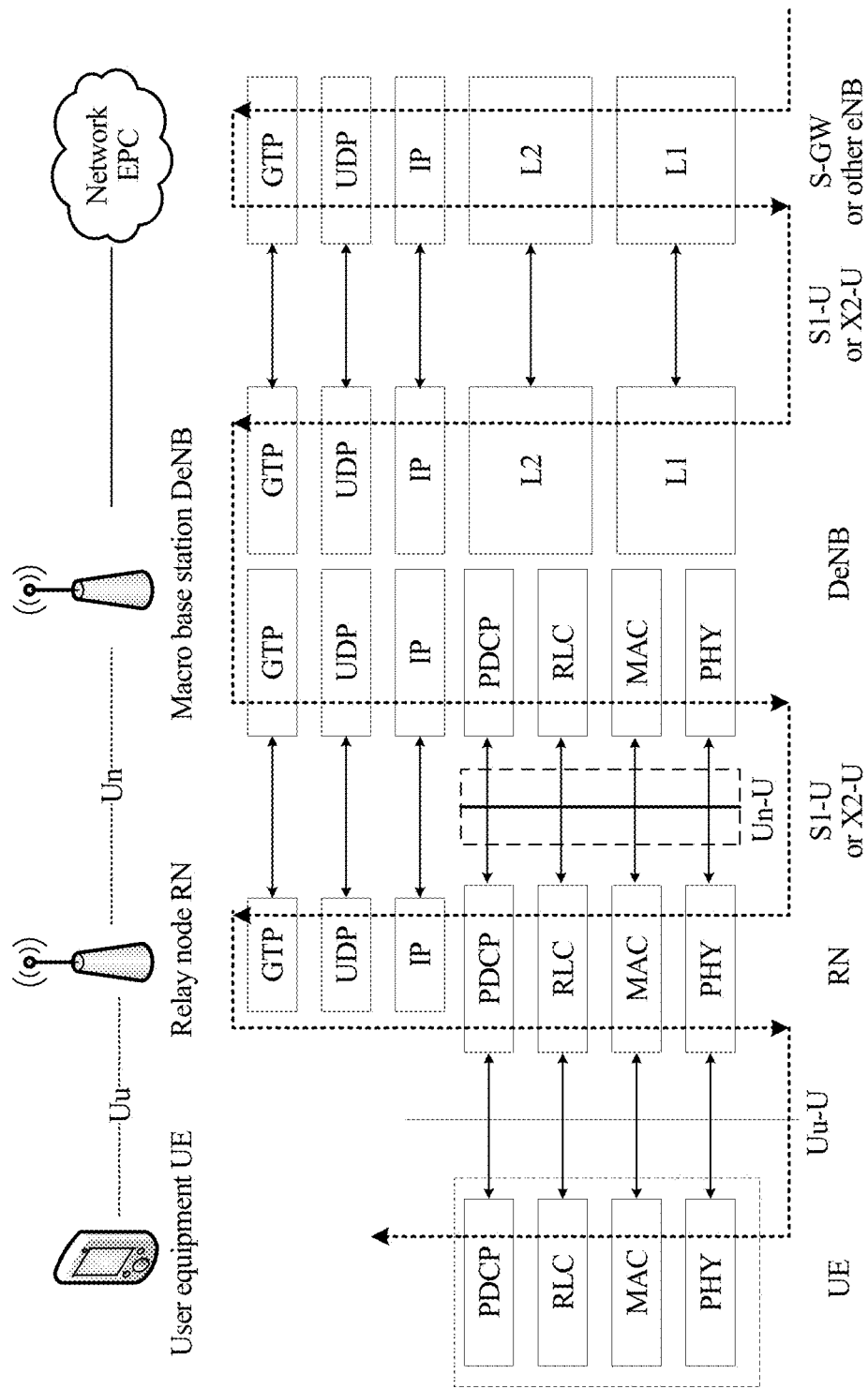
FIG. 14 is a schematic diagram of an architecture and a protocol stack of an LTE-A relay system.

For another example, FIG. 14 is a schematic diagram of an architecture and a protocol stack of an existing LTE-A relay system. In the architecture, processing by a relay node RN is relatively complex, and parsing processing and forwarding processing need to be performed on data at a PDCP layer, an RLC layer, a MAC layer, and a PHY layer. Therefore, a time consumed in processing is relatively long.

In the embodiments of the present invention, a user plane protocol stack for transmission is simplified and is formed by only a PHY layer, processing by a forwarding node is simplified, a delay is reduced, multi-hop relay transmission can be implemented, and expansibility is good.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the principle of the present invention should fall within the protection scope of the present invention.

What is claimed is:

1. A base station, wherein the base station comprises:
a processor, configured to determine, according to channel state information (CSI), a transmission path for forwarding first data to a first terminal such that when the processor determines that the first data needs to be forwarded by at least one small cell to the first terminal, the transmission path comprises a path from the base station to a small cell and a path from the small cell to the first terminal; and
a transmitter, configured to send, according to the transmission path determined by the processor, a first data frame to the first terminal via the at least one small cell, wherein the first data frame comprises resource assignment information and the first data, the resource assignment information comprises resource assignment information indicating resource assignment from the base station to the small cell and resource assignment from the small cell to the first terminal.

2. The base station according to claim 1, wherein the processor is configured to:
perform information encapsulation for the first data according to the transmission path determined by the processor, to obtain backhaul link data, wherein the backhaul link data is data that needs to be forwarded by at least one small cell; and
assemble the first data frame by using the resource assignment information and the backhaul link data obtained by the processor; and
the transmitter is configured to send the first data frame assembled by the processor to a small cell in the transmission path, wherein the small cell is a next hop of the base station to enable the small cell to assemble a second data frame and to send the second data frame to the first terminal, or to send the second data frame to a next next-hop small cell, wherein the next next-hop small cell forwards the second data frame to the first terminal.

3. The base station according to claim 2, wherein if the processor determines that the first data is to be forwarded by one small cell to the first terminal, the backhaul link data in the first data frame assembled by the processor comprises access link data in the second data frame, and the first data is the access link data in the second data frame; or
when the processor determines that the first data needs to be forwarded by at least two small cells to the first terminal, the backhaul link data in the first data frame assembled by the processor comprises backhaul link data in the second data frame, and the first data is the backhaul link data in the second data frame.

4. The base station according to claim 3, wherein the first data frame assembled by the processor comprises a control part and a data part, the resource assignment information is the control part, and the first data is the data part; and
the resource assignment information in the first data frame further includes a type identifier and information indicating a resource assignment manner of the control part, and a type identifier and information indicating a resource assignment manner of the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame.

5. The base station according to claim 4, wherein the resource assignment information in the first data frame assembled by the processor further includes information indicating a mapping method for the small cell that receives the first data frame to assemble the second data frame, so that the small cell performs mapping according to the mapping method to assemble the second data frame.

6. The base station according to claim 1, wherein the transmitter is further configured to: before the processor determines, according to the channel state information (CSI), the transmission path for forwarding the first data to the first terminal, send a CSI scheduling message to a terminal or a small cell within a service range of the base station; and the base station further comprises: a receiver, configured to receive the CSI feedback by the terminal or the small cell, wherein the CSI scheduling message comprises a specific frequency band at which the terminal or the small cell measures the CSI and a feedback manner that are configured by the base station, and the CSI feedback by the small cell comprises CSI obtained by the small cell by means of measurement, CSI sent by another small cell to the small cell and forwarded by the small cell to the base station, or CSI sent by another terminal to the small cell and forwarded by the small cell to the base station.

7. The base station according to claim 6, wherein the CSI scheduling message sent by the transmitter specifically comprises first indication information, wherein the first indication information is used to instruct the terminal to feed back the CSI to the small cell at a specified frequency band and forward the CSI to the base station in a data form via the small cell, so that the terminal that receives the CSI scheduling message feeds back the CSI in a manner indicated by the first indication information.

8. A small cell, wherein the small cell comprises:
a receiver, configured to receive a first data frame sent by a previous-hop node, wherein the first data frame comprises resource assignment information and data, the data comprising at least backhaul link data, the backhaul link data comprising first data to be sent to a first terminal, the resource assignment information comprising at least backhaul data resource assignment information, and the backhaul data resource assignment information comprising resource assignment information from the small cell to the first terminal;
a processor, configured to assemble a second data frame by using the backhaul link data in the first data frame received by the receiver, wherein the second data frame comprises resource assignment information and data, the data in the second data frame comprises at least one of the following: access link data and backhaul link data, the resource assignment information in the second data frame comprises at least one of the following:
access data resource assignment information and backhaul data resource assignment information,
the access link data in the second data frame is data of a terminal served by the small cell in the backhaul link data in the first data frame, and
the backhaul link data in the second data frame is data that needs to be forwarded by a next-hop node in the backhaul link data in the first data frame, wherein
when the first terminal is a terminal served by the small cell, the first data is the access link data in the second data frame; or when the first terminal is a terminal served by another small cell, the first data is the backhaul link data in the second data frame; and
a transmitter, configured to send the second data frame assembled by the processor to the next-hop node or the terminal served by the small cell.

9. The small cell according to claim 8, wherein the first data frame or the second data frame comprises a control part and a data part, the resource assignment information is the control part, and the backhaul link data or the access link data is the data part;
the resource assignment information in the first data frame further includes type identifiers and resource assignment manners of the control part and the data part; and
the processor is specifically configured to: according to the type identifiers and the information indicating the resource assignment manners, map information in the control part in the backhaul link data in the first data frame to the control part of the second data frame, and map information in the data part in the backhaul link data in the first data frame to the data part of the second data frame, to assemble the second data frame.

10. The small cell according to claim 8, wherein the receiver is further configured to receive a channel state information (CSI) scheduling message sent by a base station or CSI sent by another node or another terminal; and
the processor feeds back, according to the CSI scheduling message received by the receiver, CSI obtained by means of measurement to the base station by using the transmitter; or the processor forwards the CSI received by the receiver to the base station, wherein the CSI received by the receiver comprises CSI sent by the another small cell to the small cell or CSI sent by the another terminal to the small cell.

11. A data transmission method, wherein the method comprises:
determining, by a base station according to channel state information (CSI), a transmission path for forwarding first data to a first terminal, such that when the base station determines that the first data needs to be forwarded by at least one small cell to the first terminal, the transmission path comprises a path from the base station to a small cell and a path from the small cell to the first terminal; and
sending, by the base station according to the transmission path, a first data frame to the first terminal via the at least one small cell, wherein the first data frame comprises resource assignment information and the first data, the resource assignment information indicating assignment from the base station to the small cell and resource assignment from the small cell to the first terminal.

12. The method according to claim 11, wherein the sending, by the base station according to the transmission path, a first data frame to the first terminal via the at least one small cell specifically comprises:
performing, by the base station, information encapsulation for the first data according to the transmission path, to obtain backhaul link data, wherein the backhaul link data is data that needs to be forwarded by at least one small cell;
assembling, by the base station, the first data frame by using the resource assignment information and the backhaul link data; and
sending, by the base station, the first data frame to a small cell in the transmission path, wherein the small cell is a next hop of the base station, to enable the small cell to assemble a second data frame and to send the second data frame to the first terminal, or to send the second data frame to a next next-hop small cell, wherein the next next-hop small cell forwards the second data frame to the first terminal.

13. The method according to claim 12, wherein if the base station determines the first data is to be forwarded by one small cell to the first terminal, the backhaul link data in the first data frame comprises access link data in the second data frame, and the first data is the access link data in the second data frame; or
when the base station determines that the first data needs to be forwarded by at least two small cells to the first terminal, the backhaul link data in the first data frame comprises backhaul link data in the second data frame, and the first data is the backhaul link data in the second data frame.

14. The method according to claim 13, wherein the first data frame comprises a control part and a data part, the resource assignment information is the control part, and the first data is the data part; and
the resource assignment information in the first data frame further includes type identifiers and information indicating resource assignment manners of the control part and the data part, so that, according to the type identifiers and the information indicating the resource assignment manners, the small cell that receives the first data frame respectively acquires information in the control part and information in the data part that are in the backhaul link data in the first data frame, and further maps the acquired information in the control part to a control part of the second data frame and maps the acquired information in the data part to a data part of the second data frame, to assemble the second data frame.

15. The method according to claim 14, wherein the resource assignment information in the first data frame further indicates a mapping method for the small cell that receives the first data frame to assemble the second data frame, so that the small cell performs mapping according to the mapping method to assemble the second data frame.

16. The method according to claim 11, wherein before determining, by a base station according to channel state information (CSI), the transmission path for forwarding first data to a first terminal, the method further comprises:
sending, by the base station, a CSI scheduling message to a terminal or a small cell within a service range of the base station, and receiving the CSI feedback by the terminal or the small cell, wherein the CSI scheduling message comprises a specific frequency band at which the terminal or the small cell measures the CSI and a feedback manner that are configured by the base station, and the CSI feedback by the small cell comprises CSI measured by the small cell, CSI sent by another small cell to the small cell and forwarded by the small cell to the base station, or CSI sent by another terminal to the small cell and forwarded by the small cell to the base station.

17. A data transmission method, wherein the method comprises:
receiving, by a current node, a first data frame sent by a previous-hop node, wherein the first data frame comprises resource assignment information and data, the data comprising at least backhaul link data, the backhaul link data comprising first data to be sent to a first terminal, the resource assignment information comprising at least backhaul data resource assignment information, and the backhaul data resource assignment information comprising resource assignment information from the current node to the first terminal;
assembling, by the current node, a second data frame by using the backhaul link data in the first data frame, wherein
the second data frame comprises resource assignment information and data, the data in the second data frame comprises at least one of the following: the access link data and the backhaul link data,
the resource assignment information in the second data frame comprises at least one of the following: access data resource assignment information and backhaul data resource assignment information, the access link data in the second data frame is data of a terminal served by the current node in the backhaul link data in the first data frame, and the backhaul link data in the second data frame is data that needs to be forwarded by a next-hop node in the backhaul link data in the first data frame, wherein if the first terminal is a terminal served by the current node, the first data is the access link data in the second data frame; or if the first terminal is a terminal served by another node, the first data is the backhaul link data in the second data frame; and
sending, by the current node, the second data frame to the next-hop node or the terminal served by the current node.

18. The method according to claim 17, wherein the first data frame or the second data frame comprises a control part and a data part, the resource assignment information is the control part, and the backhaul link data or the access link data is the data part;
the resource assignment information in the first data frame further includes type identifiers and resource assignment manners of the control part and the data part; and
the assembling, by the current node, a second data frame by using the backhaul link data in the first data frame specifically comprises:
according to the type identifiers and the information indicating the resource assignment manners, mapping, by the current node, information in the control part in the backhaul link data in the first data frame to the control part of the second data frame, and mapping information in the data part in the backhaul link data in the first data frame to the data part of the second data frame, to assemble the second data frame.

19. The method according to claim 17, wherein the first data frame or the second data frame is transmitted by using a user plane protocol stack, and the user plane protocol stack is formed by only a physical layer (PHY) layer.

20. The method according to claim 17, wherein before the receiving, by a current node, a first data frame sent by a previous-hop node, the method further comprises:
receiving, by the current node, a channel state information (CSI) scheduling message sent by a base station, and feeding back, according to the CSI scheduling message, CSI obtained by means of measurement to the base station, or forwarding CSI received by the current node to the base station, wherein the CSI received by the current node comprises CSI sent by another small cell to the current node or CSI sent by a terminal to the current node.

* * * * *